US007756548B2

(12) United States Patent
Laroia et al.

(10) Patent No.: US 7,756,548 B2
(45) Date of Patent: *Jul. 13, 2010

(54) METHODS AND APPARATUS FOR USE IN A WIRELESS COMMUNICATIONS SYSTEM THAT USES A MULTI-MODE BASE STATION

(75) Inventors: Rajiv Laroia, Basking Ridge, NJ (US); Pablo Anigstein, Springfield, NJ (US); Arnab Das, Jersey City, NJ (US); Sundeep Rangan, Jersey City, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1165 days.

This patent is subject to a terminal disclaimer.

(21) Appl. No.: 11/229,846

(22) Filed: Sep. 19, 2005

(65) Prior Publication Data
US 2007/0066329 A1 Mar. 22, 2007

(51) Int. Cl.
*H04W 52/00* (2009.01)
*H04W 88/08* (2009.01)
(52) U.S. Cl. .................. 455/561; 455/522; 455/127.5
(58) Field of Classification Search ............. 455/522, 455/524, 561, 562.1, 422.1, 423, 424, 502, 455/127.1, 127.5
See application file for complete search history.

(56) References Cited

U.S. PATENT DOCUMENTS

| | | | |
|---|---|---|---|
| 6,134,234 A | 10/2000 | Kapanen | |
| 6,584,330 B1 * | 6/2003 | Ruuska | 455/561 X |
| 6,671,291 B1 | 12/2003 | Soliman | |
| 6,725,053 B2 | 4/2004 | Rosen et al. | |
| 6,738,617 B2 | 5/2004 | Rosen et al. | |
| 6,904,288 B2 | 6/2005 | Rosen et al. | |
| 7,047,005 B2 | 5/2006 | Kinnavy | |
| 7,403,470 B2 * | 7/2008 | Lane et al. | 370/203 |

FOREIGN PATENT DOCUMENTS

| | | |
|---|---|---|
| GB | 2 366 695 A | 3/2002 |
| GB | 2 398 970 A | 9/2004 |
| RU | 2158490 | 10/2000 |
| RU | 2255429 | 6/2005 |
| WO | 0176098 | 10/2001 |
| WO | 02061973 | 8/2002 |

OTHER PUBLICATIONS

International Search Report for PCT/US2006/035931, 3 pages, dated Jan. 15, 2007.
Written Opinion of the International Searching Authority for PCT/US2006/035931, 5 pages, dated Jan. 15, 2007.

* cited by examiner

*Primary Examiner*—Philip J Sobutka
(74) *Attorney, Agent, or Firm*—James K. O'Hare

(57) ABSTRACT

A multi-mode base station includes a transmit standby mode and an active mode. Transmit standby mode of base station operation is a low power/low interference level of operation as compared to active mode. In transmit standby mode at least some of the synchronization signaling such as pilot tone signaling is reduced in power level and/or rate with respect to the active mode. In transmit standby mode, the base station has no active state registered wireless terminals being serviced but may have some sleep state registered wireless terminals being serviced. Mode transitions from active to transmit standby may be in response to: a detected period of inactivity, scheduling information, base station mode change signals, and/or detected wireless terminal state transition. Mode transitions from transmit standby to active may be in response to: scheduling information, access signals, wake-up signals, hand-off signals, wireless terminal state change signals, and/or base station mode change signals.

30 Claims, 19 Drawing Sheets

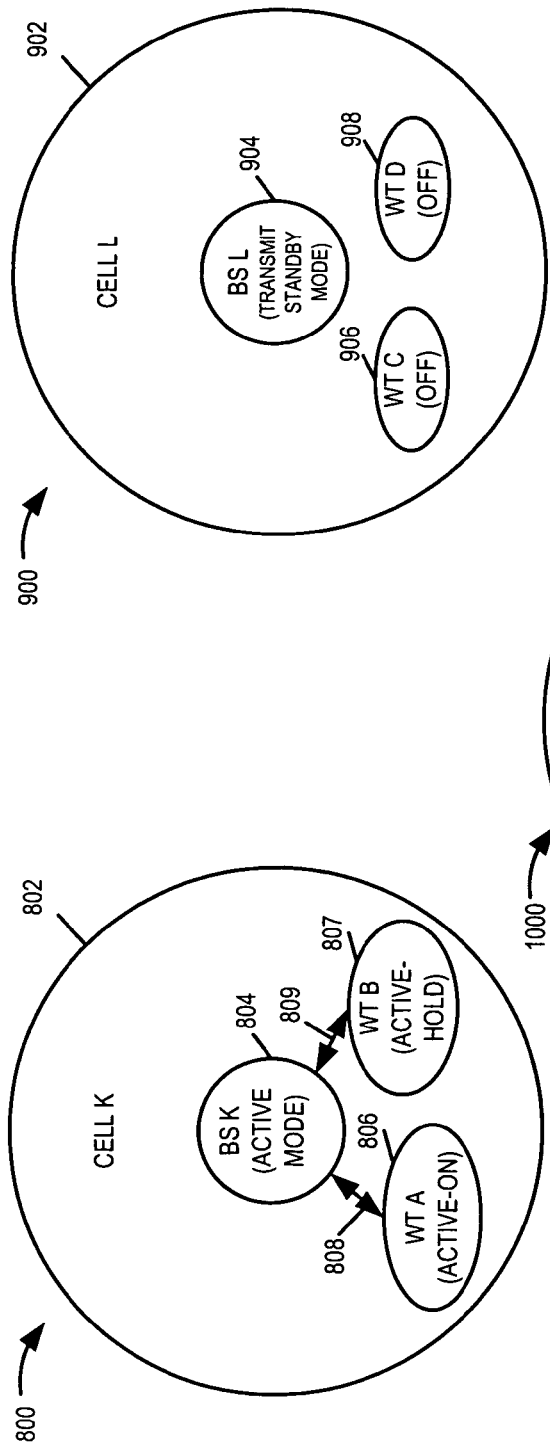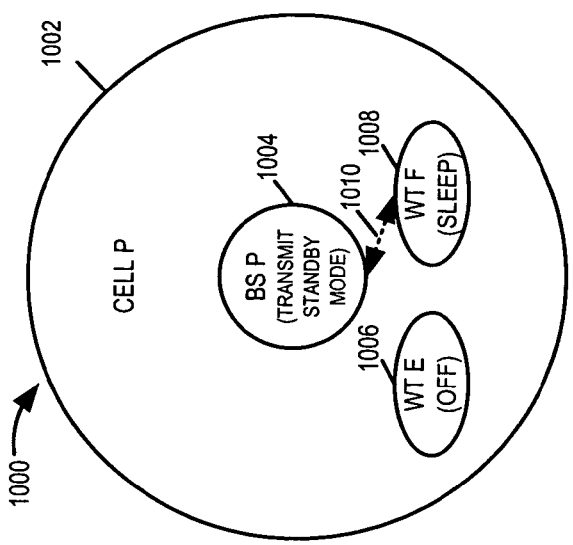

| FIGURE 13A |
|---|
| FIGURE 13B |
| FIGURE 13C |

METHODS AND APPARATUS FOR USE IN A WIRELESS COMMUNICATIONS SYSTEM THAT USES A MULTI-MODE BASE STATION

FIELD OF THE INVENTION

The present invention relates to methods and apparatus for implementing wireless communications systems where the apparatus may include, for example, base stations which support multiple modes of operation and/or wireless terminals for interacting with base stations which support multiple modes of operation.

BACKGROUND OF THE INVENTION

Typically, in a wireless communications system, the base stations are powered on and continuously operated in an active mode of operation. In this active mode of operation, the base station is operated in accordance with a downlink timing and frequency structure, e.g., a repetitive timing and frequency structure. Synchronization signals, such as beacon signals and pilot signals, are transmitted on a scheduled basis at associated predetermined power levels. The power levels and rate of transmission of these synchronization signals do not typically vary regardless of the number and/or state of users being currently serviced by the base station. In high population density cellular coverage areas, this in not a significant consideration, as there is usually at least one or more active users at any given time using the base station as their network point of attachment and communicating user data. Those active wireless terminals need the full level of synchronization signals such as to maintain precise timing synchronization and maintain accurate current channel estimates.

However, in some cellular coverage areas, such as remote rural areas having low population densities and/or areas having widely varying load requirements as a function of time or a schedule, it would be advantageous if methods and apparatus were developed which allowed a base station to be operated, at certain time and/or under certain conditions, such as to reduce transmission power and/or reduce interference generated by the base station. For example, consider that a base station, e.g., a base station along a train track in a rural area, may have significant time intervals where the base station does not have any registered wireless terminals that need to communicate user data, e.g., receive and/or transmit user data. Under such a situation, during such a time interval the base station power is wasted by transmitting the full set of synchronization signals at the normal power levels. In addition, neighboring cells, which may have high population densities and typically have many active users, will be adversely affected by the interference generated from the unnecessary synchronization broadcast signaling. By reducing the interference level experienced in an adjacent cell the data throughput in that adjacent cell can be increased, e.g., by being able to increase the coding rate for a given transmission power level and modulation scheme.

It would be desirable if methods and apparatus were developed which allowed for reducing broadcast synchronization signals in response to changing system conditions. It would be beneficial if such methods and apparatus supported at least some of: rapid transitioning back to a full level of synchronization signals when required, easily detectable reactivation signaling, seamless hand-off operations, and the capability to transition between different levels of synchronization signaling as a function of schedule information. It would also be advantageous if the methods and apparatus developed to support multiple levels of synchronization signaling would still be capable of supporting registered wireless terminals in a wireless terminal sleep state irrespective of the level of synchronization signaling. In addition, it would be beneficial if the low level of synchronization signaling still provided a wireless terminal with the capability to be able to detect the presence of a base station and/or compare the base station's received signal strength with other adjacent base stations which could potentially be used as network attachment points.

In view of the above, there is a need for new methods and apparatus to implement and support multi-mode base station operations.

SUMMARY

The present invention relates to methods and apparatus for implementing wireless communications systems where the apparatus may include, for example, base stations which support multiple modes of operation and/or wireless terminals for interacting with base stations which support multiple modes of operation.

In various embodiments of the invention, a base station supports multiple modes of operation, e.g., a first mode such as a full-on mode, and a second mode such as a sleep mode. More than two modes of operation may be, and in some embodiments are, supported by the base station with each mode corresponding to, e.g., different signaling rates of at least one periodic signal and/or different power levels used to transmit some particular periodic signals such as a group of pilot tones or beacon signals.

By supporting multiple modes of operation, base station transmissions of control signals can be reduced when the higher level of signaling is not required, e.g., when there are no active wireless terminals in the cell. By reducing base station transmissions in terms of frequency and/or power level, interference with communications in neighboring cells can be reduced. This allows for improved throughput in a multi-base station system where transmissions by adjoining base stations can interfere with one another. Depending on the particular mode of operation, the base station may support downlink signaling, e.g., broadcast transmission of data but not uplink transmissions of data which may require a higher level of control signaling. Modes which support both downlink and uplink communication of user data, e.g., text data, image data, audio data and/or user application data, between wireless terminals and a base station normally correspond to one or more higher, e.g., full-on, modes of base station operation.

During different modes of base station operation, different levels and/or rates of signaling and/or transmission output power are supported depending on the mode of operation. For example, in some embodiments, pilot signals and/or various control signals which are normally transmitted at a first periodic rate in a fully on state are transmitted at a reduced rate during a sleep mode of base station operation as compared to a full-on mode of base station operation. In some embodiments the number of pilot signals transmitted during a sleep mode is reduced during individual symbol transmission time periods during the sleep mode of operation as compared to the full-on mode of operation. In some embodiments, the number of individual symbol transmission time periods during which pilot signals are transmitted during the sleep mode of operation is reduced from the number of individual symbol transmission time periods during which pilot signals are transmitted in the full-on mode of operation, with respect to the same number of OFDM symbol transmission time periods, e.g., the same number of successive OFDM symbol transmission time periods representing a grouping in a repetitive downlink timing structure. In some embodiments, during a partial on or sleep mode of operation the power level at which particular signals are transmitted is reduced as compared to the power level used during the full-on mode of operation.

Base station transition between modes of operation can be triggered in a plurality of ways. The base station may operate in different modes according to a predetermined schedule, e.g., a train schedule, commuter schedule or other type of schedule. Such a schedule may be designed so that the base station will operate in the full-on state at particular points in time known to normally correspond to periods of wireless terminal data communications activity. Alternatively, or in addition to scheduled modes of base station operation, in some embodiments base stations monitor for wireless terminal activity in the cell which they serve and adjust the mode of operation to correspond to the detected level of communications data activity. For example, a base station may transition from a full-on state to a lower activity mode of operation with less control signaling in response to detecting a period in which no user data, e.g., text, voice or other types of user application data, have been transmitted for a predetermined period of time or when there is a determination that the cell does not include any active or registered wireless terminals.

Transitions from a base station sleep mode of operation to a full-on mode of operation are triggered, in some embodiments, by the receipt of a wake up signal from a mobile node. Wireless terminal registration signals and/or mobile node requests to transition from a sleep mode of mobile node operation to an active mode of mobile node operation in which the mobile node can transmit user data in an uplink can serve as wakeup signals and/or control signals which are used to trigger a change in base station operation from a less active to more active mode of base station operation.

The methods and apparatus of the present invention support base stations with different modes of activity. While transmission power conservation is one benefit of supporting multiple base station modes of operation, the reduced level of signal interference achieved by supporting reduced activity modes of base station operation can increase overall system throughput by decreasing interference in neighboring cells when operating in a sleep state or other reduced activity mode of base station operation.

Numerous additional features benefits and embodiments of the present invention are discussed in the detailed description which follows.

BRIEF DESCRIPTION OF THE FIGURES

FIG. 8 is a drawing illustrating an exemplary base station, implemented in accordance with the present invention, currently in an active mode of base station operation, wherein the base station' cell includes active wireless terminals.

FIG. 9 is a drawing illustrating an exemplary base station, implemented in accordance with the present invention, currently operating in the transmit standby mode of operation, wherein the base station's cell includes wireless terminals that are turned off, but does not include any wireless terminals in the sleep state or active state.

FIG. 10 is a drawing illustrating an exemplary base station, implemented in accordance with the present invention, currently operating in the transmit standby mode of operation, wherein the base station's cell includes a wireless terminal that is turned off and a wireless terminal that is in the sleep state, but does not include any wireless terminals in the active state.

DETAILED DESCRIPTION

Figure 1:
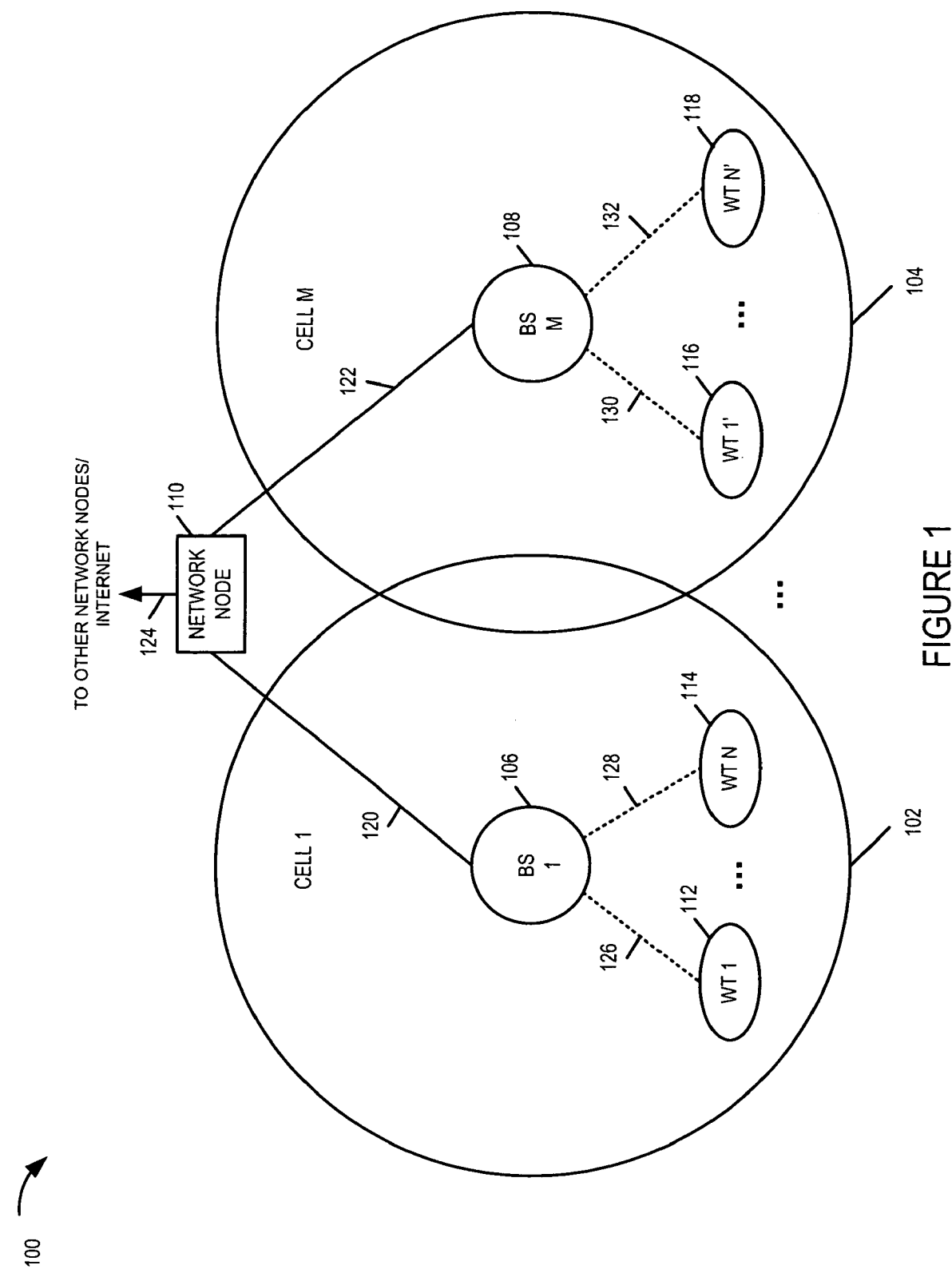
FIG. 1 is a drawing of an exemplary communications system implemented in accordance with the present invention and using methods of the present invention.

FIG. 1 is a drawing of an exemplary communications system 100 implemented in accordance with the present invention and using methods of the present invention. Exemplary communications system 100 may be, e.g., an orthogonal frequency division multiplexing (OFDM) multiple access wireless communications system. Exemplary system 100 includes a plurality of base stations (BS 1 106, BS M 108), each BS (106, 108) having a corresponding cellular coverage area (cell 1 102, cell M 104). The BSs (106, 108) are implemented in accordance with the present invention, and support (i) an active mode of operation and (ii) a transmit standby mode of operation. The BSs are coupled together via a backhaul network. System 100 also includes network node 110, e.g., a router. Network node 110 is coupled to (BS 1 106, BS M 108) via network links (120, 122), respectively. Network link 124 couples network node 110 to other network nodes, e.g., other BSs, routers, Authentication-Authorization-Accounting (AAA) nodes, home agent nodes, etc., and/or the Internet. Network links (120, 122, 124), may be, e.g., fiber optic links, cable links, and/or high capacity radio links such as directed microwave links.

System 100 also includes a plurality of wireless terminals (WT 1 112, WT N 114, WT 1' 116, WT N' 118). At least some of the WTs (112, 114, 116, 118), are mobile nodes, which may move throughout the communications system and establish a network point of attachment via the base station in the cell in which it is currently located. The WTs (112, 114, 116, 118) may be, e.g., cell phones, mobile data terminals, personal digital assistants (PDAs), laptop computers, and/or other wireless communications devices supporting the communication of voice, video, text, messages, and/or files. The WTs (112, 114, 116, 118), are implemented in accordance with the present invention, to support wireless communications signaling with the multi-mode base stations (106, 108).

WTs (112, 114) are currently situated in cell 1 102 and can be coupled to BS 1 106 via wireless links (126, 128), respectively. WTs (116, 118) are currently situated in cell M 104 and can be coupled to BS M 108 via wireless links (130, 132), respectively. WTs (112, 114, 116, 118) may operate in different states, e.g., an active state or a sleep state. In some embodiments, the active state of a WT may be further qualified with the WT supporting an active-On state and an active-Hold state.

Figure 2:
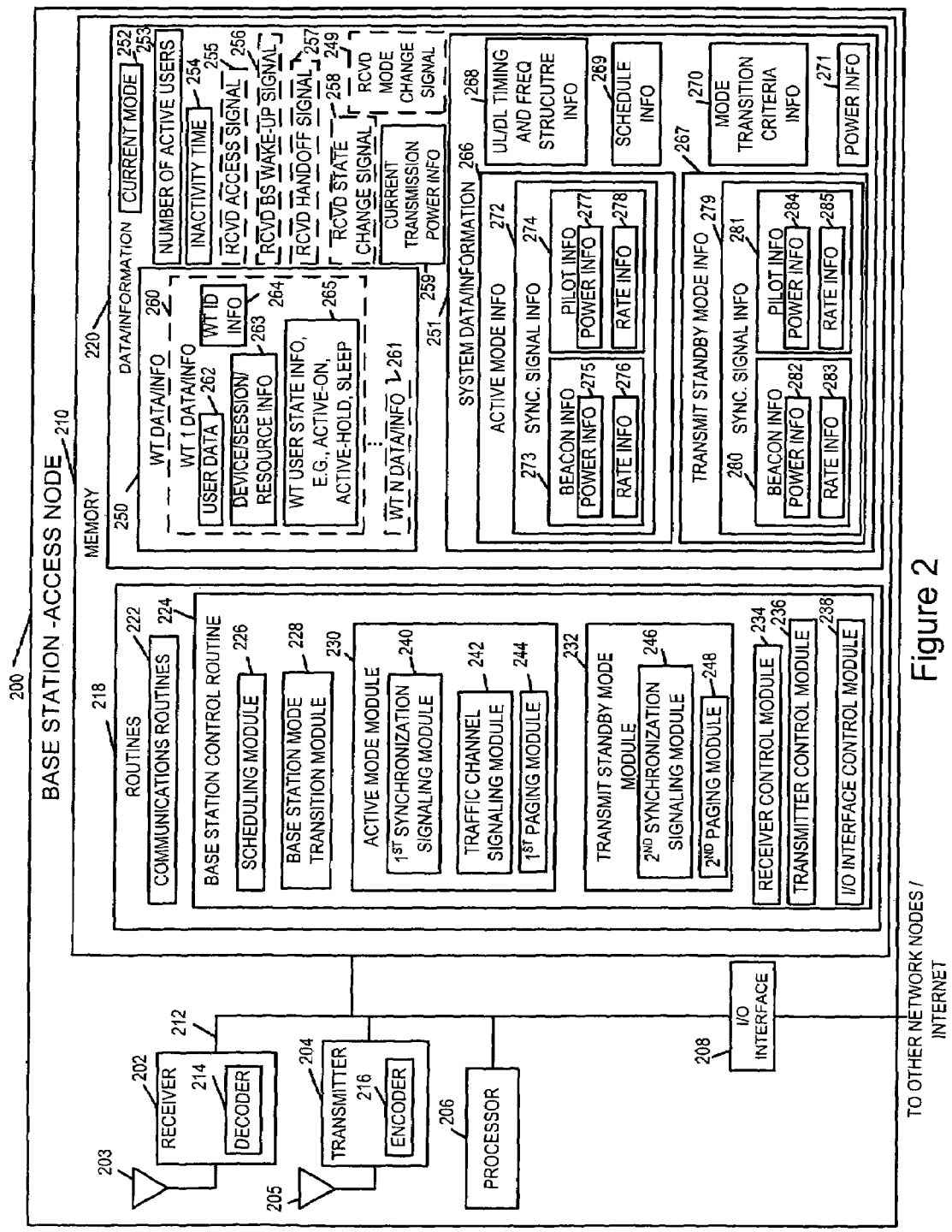
FIG. 2 is a drawing of an exemplary base station, implemented in accordance with the present invention and using methods of the present invention.

FIG. 2 is a drawing of an exemplary base station 200, implemented in accordance with the present invention and using methods of the present invention. Exemplary BS 200 may be any of the BSs (106, 108) of the system 100 of FIG. 1. Exemplary BS 200 includes a receiver 202, a transmitter 204, a processor 206, an I/O interface 208, and a memory 210 coupled together via a bus 212 over which the various elements may interchange data and information. Receiver 202 is coupled to a receive antenna 203 through which the base station 200 may received uplink signals from a plurality of wireless terminals. Received uplink signals may include, e.g., access signals, base station wake-up signals, handoff signals, WT state change signals, requests for resources, user data, power control information signals, timing control information signals, acknowledgement signals. Receiver 202 includes a decoder 214 for decoding received uplink signals, which have been previously encoded by a WT prior to transmission, e.g., decoding a coded block of user data communicated in an uplink traffic channel segment. Transmitter 204 is coupled to transmit antenna 205 via which the BS can transmit downlink signals to WTs. Downlink signals may include, e.g., beacon signals, pilot signals, power control signals, timing control signals, registration signals, paging signals, assignment signals, and user data signals. Transmitter 204 includes an encoder 216 for encoding downlink data/information, e.g., encoding a block of user data into a downlink traffic channel segment. In different modes of base station operation different sets of downlink signals may be communicated, different power levels may be used for the same type of downlink signal, and/or the frequency of transmission of different signals may be different. I/O interface 208 provides BS 200 with an interface to the backhaul network coupling BS 200 to other network nodes and/or the Internet. Signals communicated over the I/O interface 208 may include, e.g., scheduling information pertaining to switching the mode of operation of BS 200, BS wake-up signals, commanded BS mode change signals, and WT handoff signals.

Memory 210 includes routines 218 and data/information 220. The processor 206, e.g., a CPU, executes the routines 218 and uses the data/information 220 in memory 210 to control the operation of the base station 200 and implement the methods of the present invention. Routines 218 include communications routines 222 and base station control routines 224. Communications routines 222 implement the various communications protocols used by the BS 200. Base station control routines 224 includes a scheduling module 226, a base station mode transition module 228, an active mode module 230, a transmit standby mode module 232, a receiver control module 234, a transmitter control module 236, and an I/O interface control module 238.

Scheduling module 226, e.g., a scheduler, schedules uplink and downlink segments to WTs. The scheduling is a function of the mode of operation of the BS 200. In some embodiments, when the BS is in the active mode of operation the BS can schedule uplink and downlink traffic channel segments to WTs, while when the BS is in the transmit standby mode of operation, the BS does not schedule any uplink or downlink traffic channel segments to WTs.

Base station mode transition control module 228 controls the transition of the BS 200 between the active mode of operation and the transmit standby mode of operation. The base station mode transition control module 228 uses the data/information 220 in memory 220 including mode transition criteria 270, mode transition schedule information 269, number of active users 253, inactivity time 254, received access signals 255, received wake-up signals 256, received handoff signals 257, received state change signals 258, received mode change signals 249 and/or the current mode 252 in deciding whether to and at what time to transition between base station operational modes, e.g., active mode to transmit standby mode or transmit standby mode to active mode. As part of the mode transition process, mode transition module 228 activates one of active mode module 230 and transmit standby module 232, while deactivating the other one.

Active mode control module 230 controls BS operations in the active mode of base station operation. Active mode module 230 includes a $1^{st}$ synchronization signaling module 240, a traffic channel signaling module 242, and a $1^{st}$ paging module 244. First synchronization signaling module 240 uses the data/information 220 including active mode synchronization signal info 272 to control the power level and rate of synchronization signals, the synchronization signals including beacon signals and pilot signals. In the active mode of operation, at least some of the synchronization signals are controlled to be transmitted at at least one of: (i) a higher power level and (ii) a higher rate, then when the base station is operating in the transmit standby mode of operation. In the active mode of operation the base station 200 supports uplink and downlink traffic channel signaling with the scheduling module 226 scheduling uplink and downlink traffic channel segments to active WTs being serviced by the BS 200, e.g., WTs currently registered with the BS 200, operating in an active mode of operation, and currently having a BS assigned WT active user identifier. The uplink and downlink traffic channel segments are used to convey user data/information. The traffic channel signaling module 242 controls operations pertaining to the encoding, modulation and transmission of downlink traffic channel signals and controls operations pertaining to decoding, demodulation, and recovery of uplink traffic channel signals. $1^{st}$ paging module 244 controls paging operations in the active mode of base station operation.

Transmit standby mode control module 232 controls BS operations in the transmit standby mode of base station operation. Transmit standby mode module 232 includes a $2_{nd}$ synchronization signaling module 246, and a 2nd paging module 244. Second synchronization signaling module 246 uses the data/information 220 including transmit standby mode synchronization signal info 279 to control the power level and rate of synchronization signals, the synchronization signals including at least one of beacon signals and pilot signals. In the transmit standby mode of operation, at least some of the synchronization signals are controlled to be transmitted at at least one of: (i) a lower power level and (ii) a lower rate, then when the base station is operating in the active mode of operation.

Receiver control module 234 controls operations of receiver 202; transmitter control module controls operations of transmitter 204; I/O interface control module controls operations of I/O interface 208. In some embodiments, modules 234, 236, and/or 238 operate in conjunction with either active mode module 230 or transmit standby module 232 depending upon the BS's current mode 252 of operation.

Data/information 220 includes WT data information 250 system data/information 251, current mode 252, number of active users 253, inactivity time 254, and current transmission power information 259. At some times one or more of the following may be included in data information 220: received access signal information 255, received wake-up signal information 256, received hand-off signal information 257, received state change signal information 258, and received mode change signal information 249.

WT data information 250 includes different sets of information at different times depending on the WTs currently being serviced by the BS 200. At some times, the BS may not have any users either in sleep or active state that are currently registered and being serviced. At other times, the BS may have one or more users which are being serviced by the BS 200, and WT data/info 250 includes (WT 1 data/information 260, . . . , WT N data/information 261), with each set of data/information corresponding to a WT user currently being serviced. WT 1 data information 260 includes user data 262, WT identification information 264, device/session/resource information 263, and WT user state information 265. User data 262 includes, e.g., voice, video, text, data file data and information intended for WT 1 and/or intended to be sent to a peer node of WT 1 in a communications session with WT 1. WT identification information 264 includes identifiers associated with WT1, e.g., a unique device identifier, a base station assigned registered user identifier, and/or a base station assigned active user identifier. Device/session/resource information 263 includes information identifying the type of WT device, e.g., mobile phone, data terminal, model, class, tier, etc., session information including, e.g., routing information, peer node identification information, session time information, etc., and resource information including, e.g., assigned uplink and/or downlink traffic channel segments, assigned dedicated control channel segments, assigned resources for a page directed to WT1, etc. WT user state information 265 includes information identifying the current state of operation of WT 1, e.g., sleep state, active-hold ON state, or an active hold-state.

Current mode 252 includes information identifying the current mode of operation of BS 200, active mode or transmit standby mode. Number of active users 253 identifies the number of WTs currently registered with BS 200 in an active state of operation. Inactivity time 254 is a time counter maintained by BS 200 of the amount of time since at least one WT was active from the perspective of the BS 200. When, the inactivity time 254 exceeds a threshold in mode transition criteria 270, the mode transition module 228 transitions the BS from active mode to transmit standby mode.

Received access signal information 255 represents a detected received request for access by a WT, e.g., a registration request. In some embodiments, under certain conditions, the received access signal 255 may be used by transition module 228 to trigger a transition from transmit standby mode to an active mode of operation. For example, the a WT may have entered BS 200's cell and desires to communicate user data, the BS may be in a transmit standby mode, the WT may send an uplink access signal during a contention based access interval, and this received signal may be used a trigger by transition module 228 to activate transition of the BS 200 into active mode.

Received wake-up signal information 255 represents a detected received request to transition the base station from transmit standby mode to active mode. For example, a wireless terminal, by monitoring the power level and/or rate of downlink broadcast synchronization signals determines that the BS 200 is in transmit standby mode, but decides that it desires to become an active user; therefore, the WT sends a wake-up signal to the BS. For example, in some embodiments a tone or tones at predefined times, within the timing/frequency structure, may be reserved to receive the wake-up signal. In some embodiments, the same air link resources reserved for access signals may also be used for wake-up signals. In some embodiments, the wake-up signal has a different characteristic than an access signal. In some embodiment, the wake-up signal is the same as the access signal, with the BS 200 treating the received signal differently depending upon its current mode 252.

Received handoff signal 257 includes information associated with a handoff operation. In some embodiments at some times, the handoff signal may be communicated via a wireless link with a WT. In some embodiments at some times, the handoff signal may be communicated via the backhaul network through I/O interface 208, e.g., allowing for more seamless and/or faster handoff operations. Received handoff signal information 257 may be used by BS 200 to update the WT data/information and the number of active users 253. For example, if the received handoff signal information 257 indicates that the last current active user is being handed off to an adjacent base station, the information may be used to update number of active users 253 and trigger the start of inactivity timer 254. As another example, if the received handoff signal information 257 indicates that the last currently registered user at BS 200, e.g., a user in sleep state, is being handed off to an adjacent base station, the handoff signal information 257 may be used to trigger a transition from active mode to transmit standby mode without waiting for the inactivity delay timer to reach a transition criteria. As still another example, if the received handoff information 257 indicates that an active WT is to be handed off from an adjacent BS to BS 200, and BS 200 is currently in transmit standby mode, the information may be used to trigger a transition of the base station 200 to active mode, e.g., such that the BS 200 will be operating in active mode when the WT executes the handoff, providing a more seamless handoff operation.

Received mode change signal information 249 includes information received in a commanded mode change message, e.g., from a central management command node, directing that a base station mode change be executed. For example, a central management node may be directing mode changes in accordance with a schedule or in accordance with overall interference levels, load patterns, priority issues, emergency considerations, etc. As another example, an adjacent base station may send a commanded mode change message to BS 200.

Received state change signal information 258 includes received information from a WT indicating a request for a change in state, e.g., from sleep to active or from active to user. The BS's mode of operation is affected accordingly. For example, if the BS is currently in transmit standby mode and the BS receives a signal indicating that one of the WTs currently registered but in sleep state requests to be transitioned to active state, the transition module 228 may transition the base station 200 to active mode. As another example, if the BS is currently in active mode, with only one active WT, and that active WT requests to transition to sleep state, then the BS sets the number of active users 253 to zero and starts the inactivity counter, which can result in a transition of the base station to transmit standby mode if no other WT becomes active before a timeout criteria is reached.

Current transmission power information 259 is information pertaining to the current transmission of the BS. In accordance with the invention, the BS the average transmission power associated with the transmission of non-traffic channel signals during the transmit standby mode of operation is reduced when compared to the average transmission power associated with the transmission of non-traffic channel signals during the active mode of operation. For example, by reducing the power level of each pilot signal during the transmit standby mode of operation, average transmission power is reduced. Alternately, by reducing the number of pilot signal tones per OFDM symbol transmission time interval, e.g., from four to one, average transmission power is reduced. Alternately, by skipping OFDM symbol transmission time intervals during which pilot signals are conveyed, average transmission power is reduced.

System data/information 251 includes active mode information 266, transmit standby mode information 267, uplink/downlink timing and frequency structure information 268, schedule information 269, mode transition criteria information 270, and power information 271.

Active mode information 266 includes synchronization signal information 272 including characteristic information associated with the synchronization signals which are generated and transmitted by the BS while in the active mode of operation. Synchronization signal information 272 includes beacon signal information 273 and pilot signal information 274. Beacon information 273 includes power information 275, e.g., a reference power level associated with the beacon tone or tones of each beacon signal, and rate information 276, e.g., information identifying the transmission rate of the beacon signal, while in the active mode. Pilot information 274 includes power information 277, e.g., a reference power level associated with pilot tones, and rate information 278, e.g., information which identifies which OFDM transmission time intervals are used to transmit pilot tones, and how many pilot tones are communicated simultaneously in each of the OFDM transmission time intervals in which pilot tones are communicated, while in active mode.

Transmit standby mode information 267 includes synchronization signal information 279 including characteristic information associated with the synchronization signals which are generated and transmitted by the BS while in the transmit standby mode of operation. Synchronization signal information 279 includes beacon signal information 280 and pilot signal information 281. Beacon information 280 includes power information 282, e.g., a reference power level associated with the beacon tone or tones of each beacon signal, and rate information 283, e.g., information identifying the transmission rate of the beacon signal, while in the transmit standby mode. Pilot information 281 includes power information 284, e.g., a reference power level associated with pilot tones, and rate information 285, e.g., information which identifies which OFDM transmission time intervals are used to transmit pilot tones, and how many pilot tones are communicated simultaneously in each of the OFDM transmission time intervals in which pilot tones are communicated, while in transmit standby mode. In accordance with the present invention, at least some of the synchronization signals transmitted by the base station in the transmit standby mode of operation are transmitted at least one of: (i) a reduced power level and (ii) a reduced rate, with respect to the active mode of operation. This results in a lower transmission average power output by the base station while in the transmit standby mode of operation which results in reduced levels of interference from the perspective of adjacent cells which are using the same frequencies.

Uplink/downlink timing and frequency structure information 268 includes, e.g., uplink carrier frequency, uplink tone block, downlink carrier frequency, downlink tone block, uplink tone hopping information, downlink tone hopping information, segment definitions in a repetitive timing and frequency structure, beacon information, pilot information, OFDM symbol transmission timing information, and grouping of OFDM symbols into, e.g., half-slots, slots, superslots, beaconslots, utraslots, etc. Schedule information 269 includes stored schedule information identifying when to transition the base station between active and transmit standby mode. In various embodiments, schedule information 269 includes data, time, and corresponding mode information for a plurality of different times. Schedule information 269 may include predetermined schedules and/or schedules which can be adjusted. For example, BS 200 may be located in a remote low density population region and schedule information 269 may be based on a train schedules or schedules coordinated to result in the base station being in an active mode coinciding with the expected presence of a train in the base station's cell. Adjustment information may be communicated to account for delays, cancelled trains and/or added unscheduled trains.

Mode transition criteria information 270 includes information such as inactivity time limits utilized by the base station mode transition control module 228 in determining if and when to perform a mode switch. Power information 271 includes BS power information, e.g., a reference BS nominal baseline power level, and specific power levels or offsets from the baseline level associated with each of the different types of signals to be transmitted by the BS, e.g., beacon, pilot, flash assignment, regular assignment, paging, traffic channel at various data transmission rates, etc.

Figure 3:
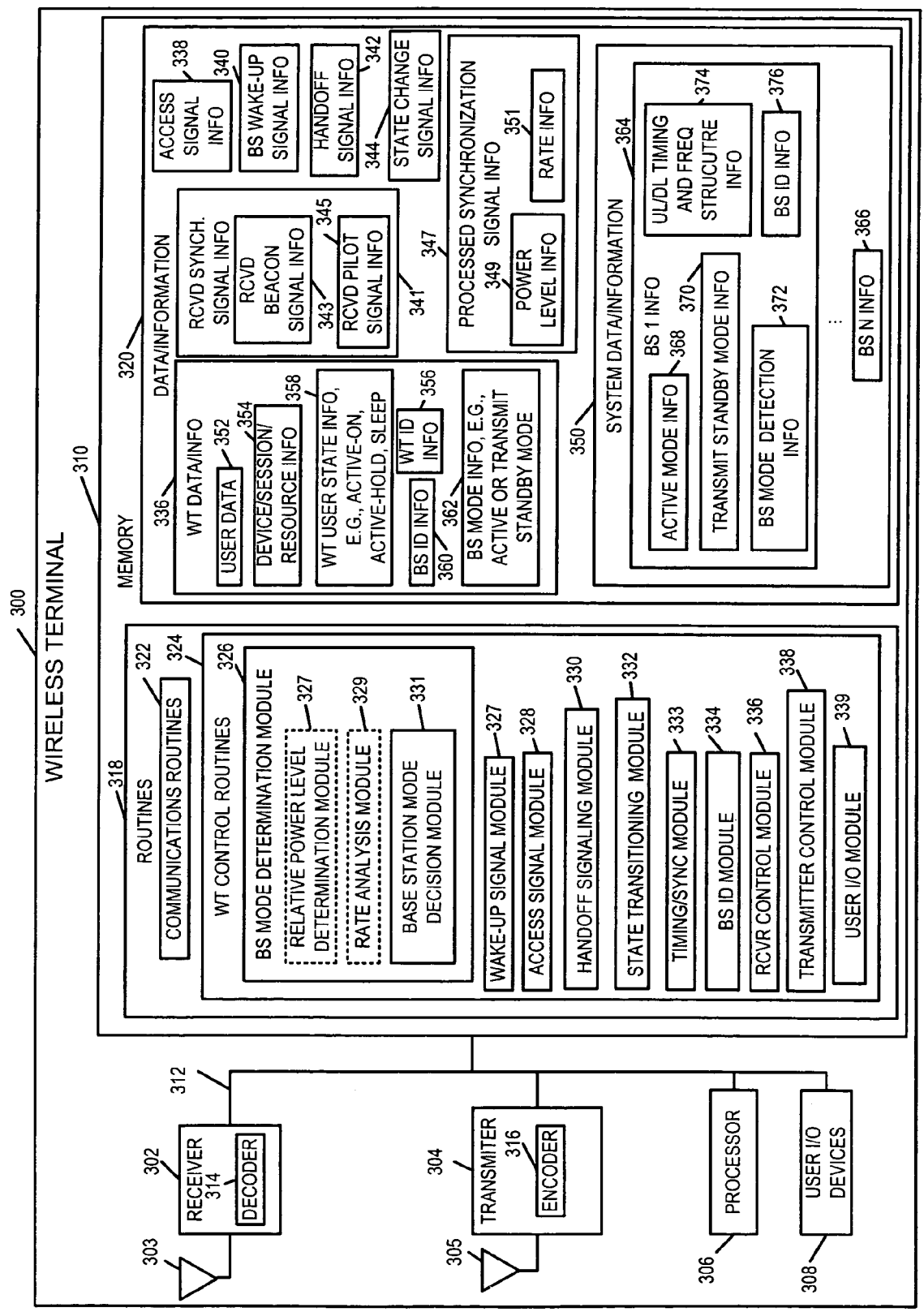
FIG. 3 is a drawing of an exemplary wireless terminal implemented in accordance with the present invention and using methods of the present invention.

FIG. 3 is a drawing of an exemplary wireless terminal (WT) 300 implemented in accordance with the present invention and using methods of the present invention. Exemplary WT 300 may be any of the WTs (112, 114, 116, 118) of exemplary system 100 of FIG. 1.

Exemplary WT 300 includes a receiver 302, a transmitter 304, a processor 306, user I/O devices 308, and a memory 310 coupled together via a bus 312 over which the various elements may interchange data and information. Receiver 302 is coupled to receive antenna 303 via which the WT 300 can receive downlink signals from BSs 200.

When the base station 200 is in the transmit standby mode of operation, the downlink signals include synchronization signals, e.g., beacon signals and pilot signals at a reduced rate and/or power level. When, the base station 200 is in the active mode of operation the downlink signals include the synchronization signals, e.g., beacons signals and pilot signals at a higher rate and/or higher power level in comparison to the transmit standby mode. In the active mode of BS operation, uplink and downlink traffic channel signaling is supported and the downlink signals typically also include assignment signals and traffic channel signals. Receiver 302 includes a decoder 314 which decodes received downlink signals which have been encoded by the base station prior to transmission.

Transmitter 304 is coupled to transmit antenna 305 through which WT 300 can transmit uplink signals to BSs 200. In some embodiments, the same antenna is used for both the receiver and transmitter. Uplink signals can include access signals, BS wake-up signals, WT state change request signals, requests for uplink traffic channel segment resources, handoff signals, power and timing control signals, and user data signals. Transmitter 304 includes encoder 316 which encodes at least some of the uplink signals prior to transmission.

User I/O devices 308 includes, e.g., switches, microphone, speaker, display, keypad, keyboard, touch-screen, mouse, camera, etc., and provides an interface for inputting user data/information and outputting received user data/information. User I/O devices 308 also allow the operator of WT 300 to control at least some operations of the WT, e.g., initiating a call, initiating a request for a mode change, access stored information, powering off, power off, etc.

Memory 310 includes routines 318 and data/information 320. The processor 306, e.g., a CPU, executes the routines 318 and uses the data/information 320 in memory 310 to control the operation of the wireless terminal and implement methods of the present invention. Routines 318 include communications routines 322, which implements the communications protocols used by the WT 300, and wireless terminal control routines 324. The WT control routines 324 includes a base station mode determination module 326, a wake-up signaling module 327, an access signaling module 328, a handoff signaling module 330, a WT state transitioning module 332, a timing/synchronization module 333, a base station identification module 334, a receiver control module 336, a transmitter control module 338, and a user I/O module 339.

Base station mode determination module 326 uses the data information 320 in memory 310 to determine the mode of operation that the BS which transmitted the received synchronization signals being evaluated, e.g., beacon and/or pilot signals, is currently operating in, e.g., transmit standby mode or active mode. For example, in some embodiments, a reduced rate of pilot tone signaling indicates that the BS is in transmit standby mode, and detected rate of received pilot tones is used by module 326 to determine the mode of the BS. As another example, in some embodiments, a reduced power level of pilot signal indicates that the base station is in transmit standby mode, and the level of the received pilot signals may be compared to the level of the received beacon signals in performing the determination. In some embodiments, a detected level shift in received pilot tones may be indicative of a base station mode change. BS mode determination module 326 includes one of more of a relative power level determination module 327 and a rate analysis module 329. The BS mode determination module 326 processes received synchronization signals to evaluate at least one of synchronization signal power levels and a rate of at least some synchronization signals. Relative power level determination module 327 determines the relative power level between at least two types of received synchronization signals, e.g., pilot tone signals and beacon signals. The rate analysis module 329 distinguishes between received synchronization signal rates corresponding to different modes of operation. For example, in some embodiments, the base station uses a different rate of pilot tone signals for the transmit standby mode and active mode of base station operation, and rate analysis module 329 measures the received pilot tone rate and identifies the received pilot tone rate with a mode of base station operation. In some embodiments, a precise measurement of pilot tone rate is not performed, but received signals are processed by rate analysis module 329 such as to be able to associate a level of synchronization signaling with one of the different modes of base station operation. Relative power level determination module 327 and/or rate analysis module 329 uses as input received synchronization signal information 341 and generate as output processed synchronization signal information 347.

Base station mode decision module 331 determines the mode of the base station operation based on the relative power level of at least two different synchronization signals and/or the rate of at least one type of synchronization signal. For example, processed synchronization signal information 347 output from the relative power level determination module 327 and/or the rate analysis module 329 is used by base station mode decision module 331 in conjunction with BS mode detection information 372 to determine the base station's current mode of operation.

In some other embodiments, the base station mode determination module 326 determines the mode of operation based on a level of downlink signaling and/or the omission of one or more of certain types of signals. For example, in some such embodiments, the base station mode determination module 326 determines the mode of base station operation based on the presence or lack thereof of assignment signals corresponding to uplink traffic channel segments.

Wake-up signaling module 327 controls the generation and transmission of wake-up signals to a BS 200, e.g., a BS 200 detected by determination module 326 to be in a transmit standby mode of operation, when WT 300 wishes to wake-up the base station, e.g., to register with the base station, to change to active state from sleep so that the WT may send uplink traffic channel data, etc.

Access signal module 328 controls the generation and transmission of access signals to a BS 200, e.g., during predetermined access intervals using predetermined tones in the uplink timing and frequency structure, the access signals not requiring precise timing synchronization and being used for initiating a registration request with a base station. Handoff signaling module 330 controls handoff operations pertaining to WT 300 including the control of the generation and transmission of handoff request signals to a BS. State transitioning module 332 controls WT 300 state transition operations and requests for transitions which are communicated to BS 300, e.g., transitions from WT sleep state to WT active state, and WT active state to WT sleep state. In some embodiments, the WT active state is further qualified as including an active-hold and an active on state. Request for state transitions may include state change request signals and requests for air link uplink resources which may be considered, in some embodiments, as a state change request. In some embodiments, WT state transitions are tracked by the BS and used by the BS in determining BS mode transitions.

Timing/synchronization module 333 performs timing synchronization and frequency synchronization operations, e.g., synchronizing the WTs uplink transmissions to arrive in synchronization with other WT transmissions in accordance with an uplink timing and frequency structure being maintained by the BS and being referenced with respect to downlink signaling synchronization signals. In some embodiments, the WT obtains a coarse level of synchronization based on received beacon and/or pilot signals and communicates BS wake-up signals and/or access signals without the need for a high level of timing synchronization. Timing/synchronization module 333 achieves a high level of synchronization, e.g., to within a cyclic prefix duration, for regular uplink signaling, including uplink traffic channel signals, communicated while the base station is in an active mode of operation. Base station identification module 334 identifies the base station transmitting the synchronization signals, e.g., beacon signals, and the identification can involve determining a network point of attachment associated with a base station, sector, and/or carrier frequency. Receiver control module 336 controls receiver 302 operations; transmitter control module 338 controls transmitter 304 operations, and user I/O module 339 controls user I/O devices 308. Some of the WT control modules may operate in conjunction to perform a specific operation. For example, the transmitter control module 338 may operate in conjunction with wake-up signaling module 327 at certain times.

Data/information 320 includes wireless terminal data/information 336, access signal information 338, base station wake-up signal information 340, handoff signal information 342, state change signal information 344, received synchronization signal information 341, processed synchronization signal information, and system data/information 350. WT data/information 336 includes user data 352, device/session/resource information 354, WT identification information 356, WT user state information 358, base station identification information 360, and base station mode information 362.

User data 352 includes, e.g., data corresponding to voice, video, text, files to be communicated to peers of WT 300 or received from peers of WT 300. Device/session/resource information 353 includes identification information of a peer of WT 300 in a communication session with WT 300, routing information, and air link resources information corresponding to WT 300, e.g., information identifying downlink and uplink traffic channel segments assigned to WT 300, while its presently connected BS is in active mode of operation. WT identification information 356 includes identifiers associated with and/or assigned to WT 300 including, e.g., a base station assigned registered user identifier, a base station assigned active user identifier, paging identifier information, and/or group identifier information. WT user state information 358 includes information identifying whether the WT is a sleep state or an active state. WT user state information 358, in some embodiments, also includes information further identifying whether the WT is in an active-On state or an active-Hold state. Base station identification information 360 includes information identifying the base station being used as the WT's current point of network attachment and/or information identifying a BS that the WT desires to register with and use as a point of network attachment. For example, base station ID information 360 may be derived from received beacon signals and/or received pilot signals. Base station mode information 360 includes information identifying the mode of operation for base stations, e.g., for identified base stations. For example, at any given time, a base station may be in transmit standby mode of operation, e.g., a sleep mode of operation having reducing output signals, lower output power and producing less interference, or the base station may be in an active mode of operation, e.g., representing a full-up operational mode and supporting uplink and downlink traffic channel signaling.

Access signal information 338, including access signal specifications such as, e.g., signal characteristics including power level information, modulation signal value information and extension portion information, is used by the access signal module 328 to generate access signals used for registering WT 300 with a base station. BS wake-up signal information 340, including wake-up signal specifications such as, e.g., signal characteristics including power level information, modulation signal value information and extension portion information, is used by the wake-up module 328 to generate wake-up signals used for waking-up a base station which is in a transmit standby mode of operation. Hand-off signal information 342, includes information used to generate handoff signals and information extracted from received hand-off signals. State change signal information 344 includes information pertaining to WT 300 state changes, e.g., information for state change request messages and information indicating that the BS has authorized a WT state change, e.g., allocating the WT an active user identifier.

Received synchronization signal information 341 includes received beacon signal information 343 and received pilot signal information 345 corresponding to received downlink synchronization signals received by receiver 302. Received synchronization signal information 343 is used an input to the relative power level determination module 327 and/or the rate analysis module 329. Processed synchronization signal information 347 includes power level information 349 and rate information 351. Processed synchronization signal information 347 includes information output from the relative power determination module and/or the rate analysis module 329, which is used as input by the base station mode decision module 331. Power level information 349 includes, e.g., a determined power level associated with received beacon signal, a determined power level associated with received pilot tone signals, and a relative power ratio between the two types of received signals. Rate information 351 includes, e.g., a determined rate of a received type of signals. In some embodiments a determined rate of pilots tone signals is, e.g., an identified number of pilot tone signals communicated simultaneously in one OFDM symbol transmission time interval. Another example of a determined rate of pilot tone signals is, e.g., a ratio of a first number of OFDM transmission time intervals including pilot tone signals to a second number of OFDM transmission time intervals during which no pilots tone signals are transmitted.

Received beacon signal information 343 in combination with processed synchronization signal information 347 includes information pertaining to and/or derived from received beacon signals, e.g., power level of the received signal, tones associated with the received beacon, time within a timing structure associated with the received beacon signal, base station, sector and/or carrier associated with the received beacon. Received pilot signal information 345 in combination with processed synchronization signal information 347 includes information pertaining to and/or derived form received pilot signals, e.g., power level of the received pilots, rate of received pilot signaling including number of pilots per OFDM symbol transmission time interval and/or fraction of OFDM symbol transmission time intervals including pilots, relative power of received pilots with respect to received beacons, and/or base station identification information derived from pilots, e.g., a base station identifier derived from a pilot slope.

System data/information 350 includes a plurality of sets of base station information (BS 1 information 364, BS N information 366). BS 1 information 364 includes active mode information 368, transmit standby mode information 370, base mode detection information 372, uplink/downlink timing and frequency structure information 374, and base station identification information 376.

Uplink/downlink timing and frequency structure information 374 includes, e.g., uplink carrier frequency, uplink tone block information, uplink tone hopping sequence information, uplink segment information, downlink carrier frequency, downlink tone block information, downlink tone hopping sequence information, OFDM symbol transmission time interval information, grouping information of OFDM symbol transmission time intervals into half-slots, slots, superslots, beaconslots, ultraslots, etc. Active mode information 368 includes information pertaining to segments, signals, and functions relevant to the active mode, e.g., traffic channel segments and signals, dedicated control channel segments and signals. Transmit standby mode information 370 includes information pertaining to segments, signals, and functions relevant to the transmit standby mode, e.g., signals associated with base station wake-up signaling and wake-up operations. Base station mode detection information 372 includes information used by base station determination module 326 to evaluate received beacons and/or pilots to determine the BS mode of operation. BS mode detection information 372 includes, e.g., rate information and/or power level information associated with each mode of BS station operation which may be used to distinguish between the different modes of base station operation. For example, information 372 may include the rate of pilot signals in each mode and/or the relative power level of pilot signals with respect to beacon signals in each mode. Base identification information 376 includes information which allows the BS ID module 334 to determine the BS corresponding to received signals, e.g., a set of beacon tones occurring at predefined frequencies and/or times within the downlink timing and frequency structure associated with BS1 and identifying BS 1 from among a plurality of base stations in the system. Identification may include identification of cell, sector and/or carrier frequency used.

Figure 4:
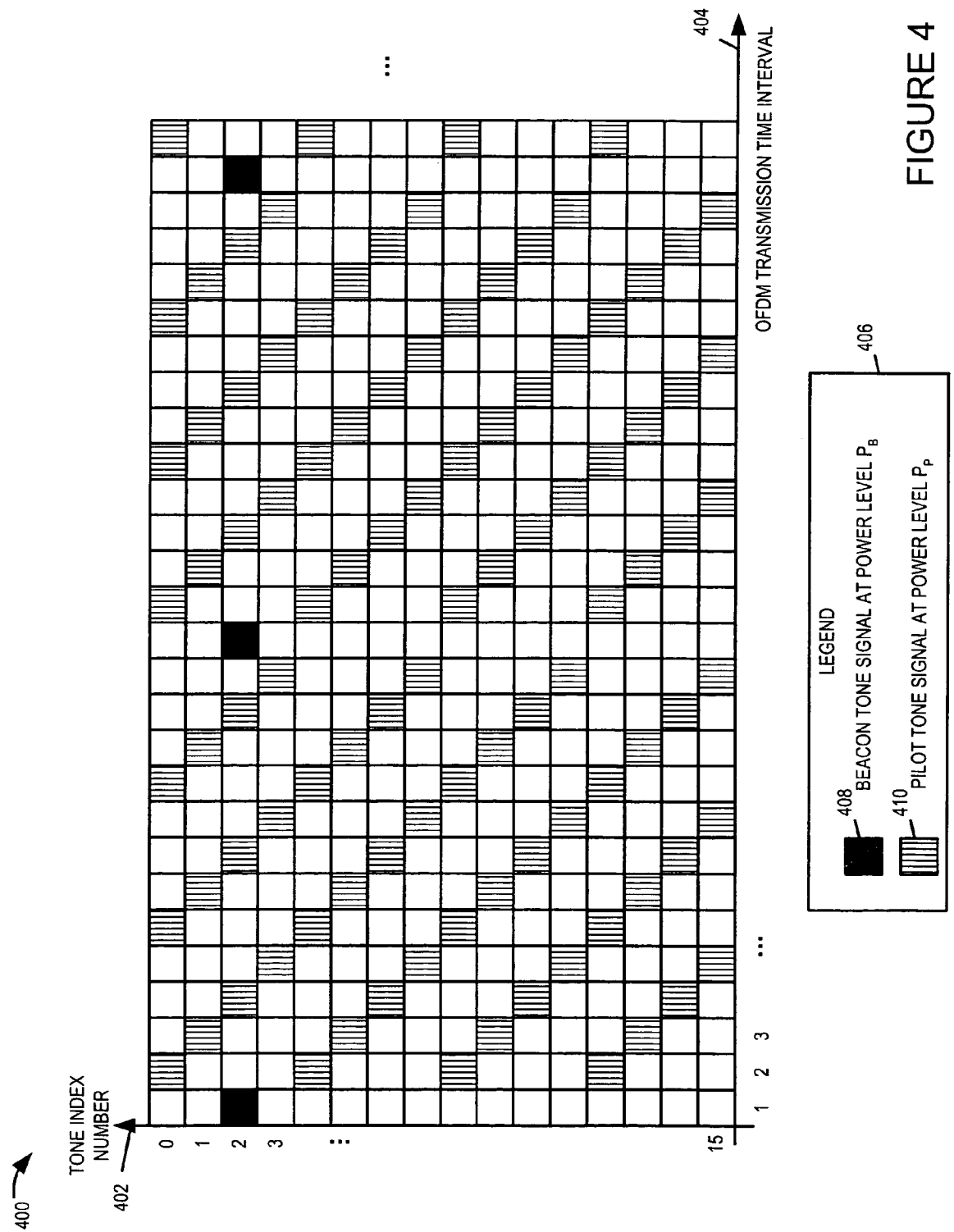
FIG. 4 is a drawing of an exemplary time frequency grid representing downlink air link resources available to a base station, implemented in accordance with the present invention, and indications of timing synchronization signals transmitted by the base station using those resources while operating in the active mode.

FIG. 4 is a drawing 400 of an exemplary time frequency grid representing downlink air link resources available to a base station, implemented in accordance with the present invention, and indications of timing synchronization signals transmitted by the base station using those resources while operating in the active mode. Vertical axis 402 represents tone index number (0, 1, 2, . . . 15) in the tone block utilized for downlink signaling by the base station. Horizontal axis 404 represents time, with each unit representing one OFDM symbol transmission time interval. Each small square in the grid represents a basic transmission unit, an OFDM tone-symbol, corresponding to one tone for the duration of one OFDM symbol transmission time interval. A modulation symbol may be conveyed corresponding to each OFDM tone-symbol of the grid. Legend 406 indicates that full shading of a grid square, as shown in legend element 408, signifies that a beacon tone signal at power level $P_B$ occupies the tone-symbol. Legend 406 also indicates that vertical line shading of a grid square, as shown in legend element 410, signifies that a pilot tone signal at power level $P_P$ occupies the tone-symbol.

Figure 5:
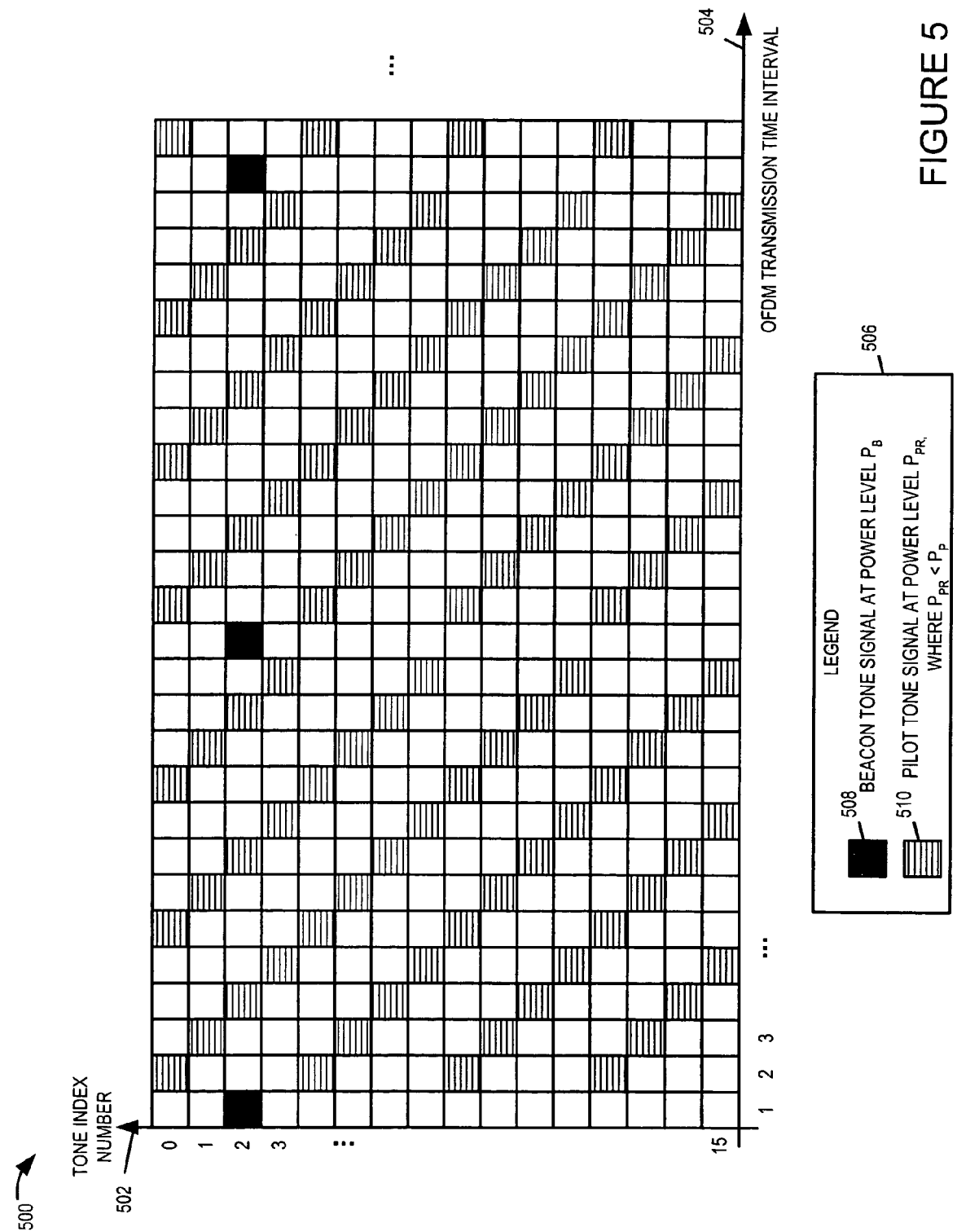
FIG. 5 is a drawing of an exemplary time frequency grid representing downlink air link resources available to a base station, implemented in accordance with the present invention, and indications of timing synchronization signals transmitted by the base station using those resources while operating in the transmit standby mode, for an exemplary embodiment.

FIG. 5 is a drawing 500 of an exemplary time frequency grid representing downlink air link resources available to a base station, implemented in accordance with the present invention, and indications of timing synchronization signals transmitted by the base station using those resources while operating in the transmit standby mode, for an exemplary embodiment. The base station may be the same base station corresponding to the description of FIG. 4, but now operating in the transmit standby mode rather than the active mode. Vertical axis 502 represents tone index number (0, 1, 2, . . . , 15) in the tone block utilized for downlink signaling by the base station. Horizontal axis 504 represents time, with each unit representing one OFDM symbol transmission time interval. Each small square in the grid represents a basic transmission unit, an OFDM tone-symbol, corresponding to one tone for the duration of one OFDM symbol transmission time interval. A modulation symbol may be conveyed corresponding to each OFDM tone-symbol of the grid. Legend 506 indicates that full shading of a grid square, as shown in legend element 508, signifies that a beacon tone signal at power level $P_B$ occupies the tone-symbol. Legend 506 also indicates that horizontal line shading of a grid square, as shown in legend element 510, signifies that a pilot tone signal at power level $P_{PR}$ occupies the tone-symbol, where $P_{PR}<P_P$. In this exemplary embodiment, by reducing the power level of each pilot signal communicated the overall average transmission power of the base station is reduced in the transmit standby mode of operation with respect to the active mode of operation.

Figure 6:
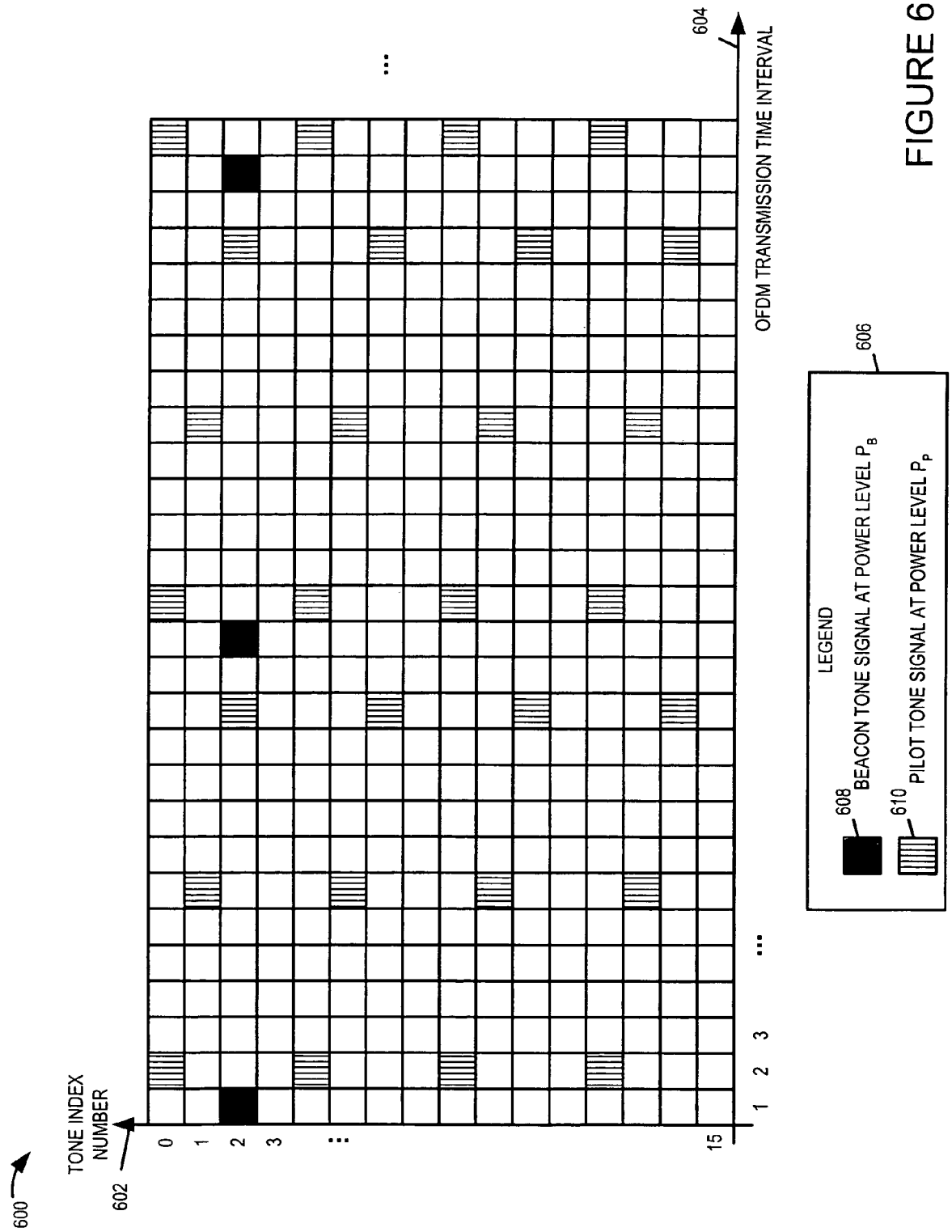
FIG. 6 is a drawing of an exemplary time frequency grid representing downlink air link resources available to a base station, implemented in accordance with the present invention, and indications of timing synchronization signals transmitted by the base station using those resources while operating in the transmit standby mode, for another exemplary embodiment.

FIG. 6 is a drawing 600 of an exemplary time frequency grid representing downlink air link resources available to a base station, implemented in accordance with the present invention, and indications of timing synchronization signals transmitted by the base station using those resources while operating in the transmit standby mode, for another exemplary embodiment. The base station may be the same base station corresponding to the description of FIG. 4, but now operating in the transmit standby mode rather than the active mode. Vertical axis 602 represents tone index number (0, 1, 2, . . . , 15) in the tone block utilized for downlink signaling by the base station. Horizontal axis 604 represents time, with each unit representing one OFDM symbol transmission time interval. Each small square in the grid represents a basic transmission unit, an OFDM tone-symbol, corresponding to one tone for the duration of one OFDM symbol transmission time interval. A modulation symbol may be conveyed corresponding to each OFDM tone-symbol of the grid. Legend 606 indicates that full shading of a grid square, as shown in legend element 608, signifies that a beacon tone signal at power level $P_B$ occupies the tone-symbol. Legend 606 also indicates that vertical line shading of a grid square, as shown in legend element 610, signifies that a pilot tone signal at power level $P_P$ In FIG. 4, 28 successive OFDM symbol transmission time intervals are shown. In FIG. 4, three of the OFDM symbol transmission time intervals include one beacon tone signal and no pilot signals, while the other 25 OFDM symbol transmission time intervals each include 4 pilot tone signals. In comparison in FIG. 6, the three beacon signal OFDM symbol transmission time intervals remain unchanged; however, the pilot signaling has been reduced. In FIG. 6, seven OFDM symbol transmission time intervals include 4 pilot signals each, while the other 18 OFDM symbol transmission time intervals include zero pilot signals. In this exemplary embodiment, by reducing the rate of pilot signaling, the overall average transmission power of the base station is reduced in the transmit standby mode of operation with respect to the active mode of operation.

Figure 7:
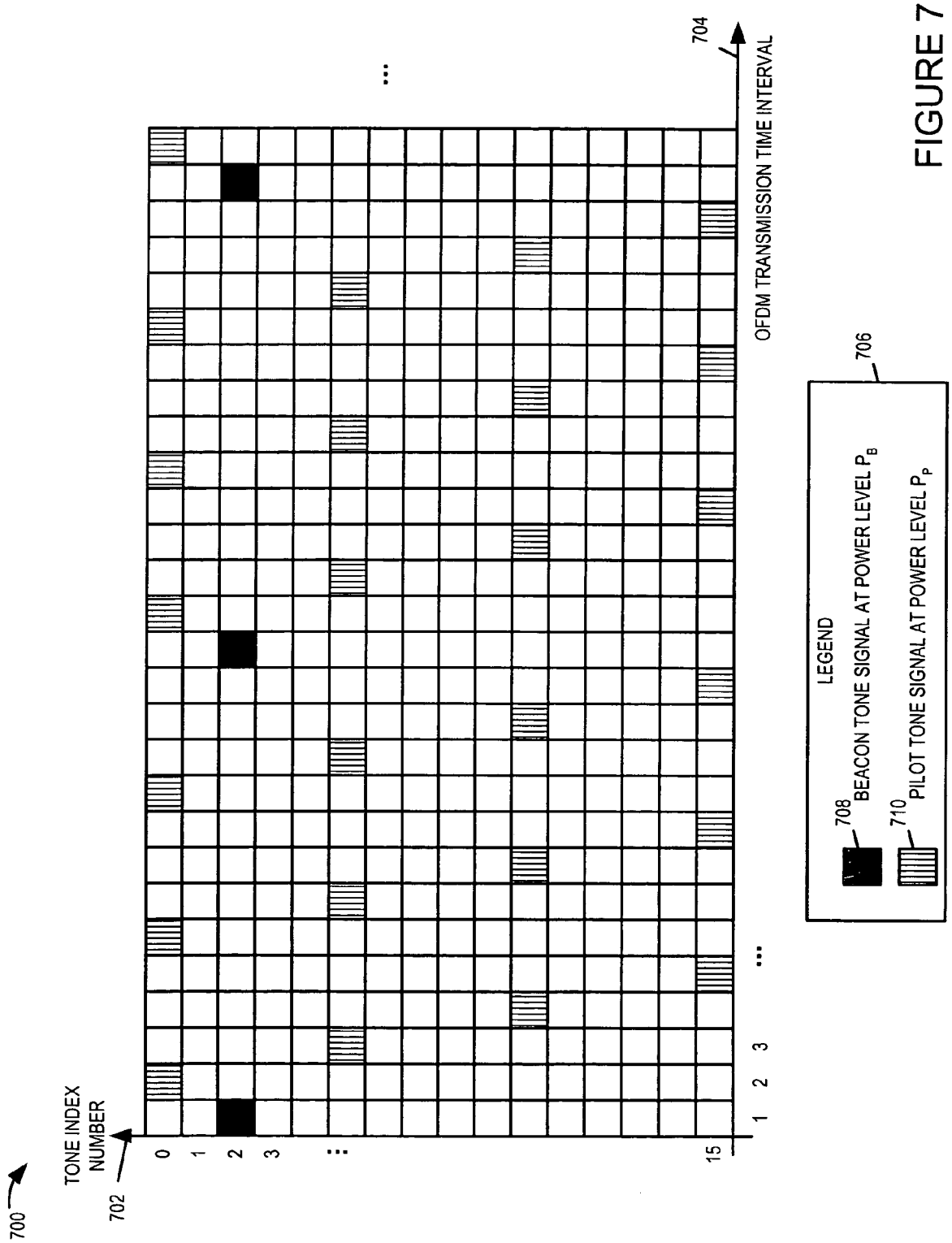
FIG. 7 is a drawing of an exemplary time frequency grid representing downlink air link resources available to a base station, implemented in accordance with the present invention, and indications of timing synchronization signals transmitted by the base station using those resources while operating in the transmit standby mode, for still another exemplary embodiment.

FIG. 7 is a drawing 700 of an exemplary time frequency grid representing downlink air link resources available to a base station, implemented in accordance with the present invention, and indications of timing synchronization signals transmitted by the base station using those resources while operating in the transmit standby mode, for still another exemplary embodiment. The base station may be the same base station corresponding to the description of FIG. 4, but now operating in the transmit standby mode rather than the active mode. Vertical axis 702 represents tone index number (0, 1, 2, . . . , 15) in the tone block utilized for downlink signaling by the base station. Horizontal axis 704 represents time, with each unit representing one OFDM symbol transmission time interval. Each small square in the grid represents a basic transmission unit, an OFDM tone-symbol, corresponding to one tone for the duration of one OFDM symbol transmission time interval. A modulation symbol may be conveyed corresponding to each OFDM tone-symbol of the grid. Legend 706 indicates that full shading of a grid square, as shown in legend element 708, signifies that a beacon tone signal at power level $P_B$ occupies the tone-symbol. Legend 706 also indicates that vertical line shading of a grid square, as shown in legend element 710, signifies that a pilot tone signal at power level $P_P$. In FIG. 4, 28 successive OFDM symbol transmission time intervals are shown. In FIG. 4, three of the OFDM symbol transmission time intervals include one beacon tone signal and no pilot signals, while the other 25 OFDM symbol transmission time intervals each include 4 pilot tone signals. In comparison in FIG. 7, the three beacon signal OFDM symbol transmission time intervals remain unchanged, however, the pilot signaling has been reduced. In FIG. 7, 25 OFDM symbol transmission time intervals include only one pilot tone signal each. In this exemplary embodiment, by reducing the rate of pilot signaling, the overall average transmission power of the base station is reduced in the transmit standby mode of operation with respect to the active mode of operation.

Figure 15:
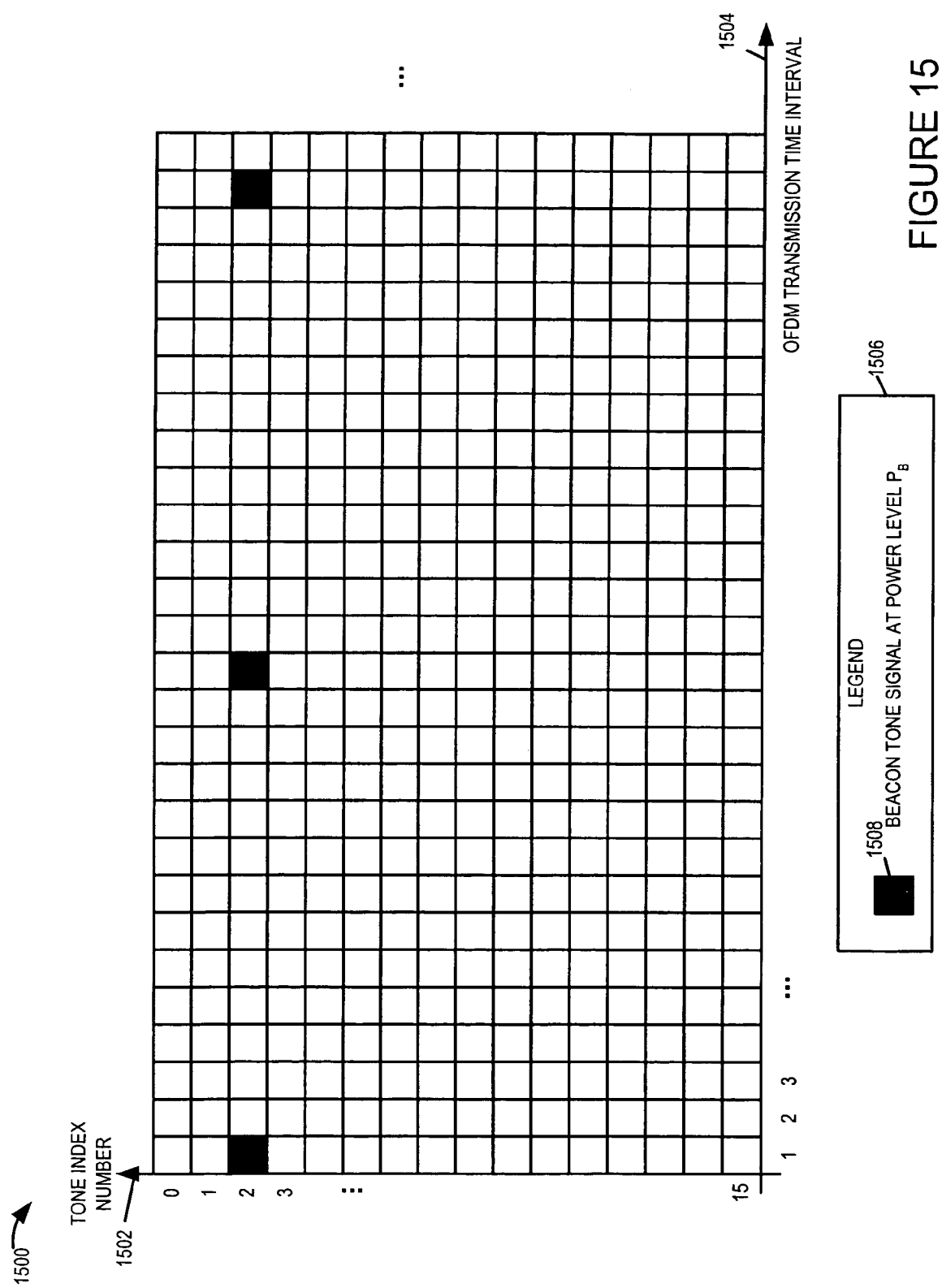
FIG. 15 is a drawing of an exemplary time frequency grid representing downlink air link resources available to a base station, implemented in accordance with the present invention, and indications of timing synchronization signals transmitted by the base station using those resources while operating in the transmit standby mode, for still another exemplary embodiment.

FIG. 15 is a drawing 1500 of an exemplary time frequency grid representing downlink air link resources available to a base station, implemented in accordance with the present invention, and indications of timing synchronization signals transmitted by the base station using those resources while operating in the transmit standby mode, for still another exemplary embodiment. The base station may be the same base station corresponding to the description of FIG. 4, but now operating in the transmit standby mode rather than the active mode. Vertical axis 1502 represents tone index number (0, 1, 2, . . . , 15) in the tone block utilized for downlink signaling by the base station. Horizontal axis 1504 represents time, with each unit representing one OFDM symbol transmission time interval. Each small square in the grid represents a basic transmission unit, an OFDM tone-symbol, corresponding to one tone for the duration of one OFDM symbol transmission time interval. A modulation symbol may be conveyed corresponding to each OFDM tone-symbol of the grid. Legend 1506 indicates that full shading of a grid square, as shown in legend element 1508, signifies that a beacon tone signal at power level $P_B$ occupies the tone-symbol. In FIG. 4, 28 successive OFDM symbol transmission time intervals are shown. In FIG. 4, three of the OFDM symbol transmission time intervals include one beacon tone signal and no pilot signals, while the other 25 OFDM symbol transmission time intervals each include 4 pilot tone signals. In comparison in FIG. 15, the three beacon signal OFDM symbol transmission time intervals remain unchanged, however, the pilot signaling has been eliminated. In this exemplary embodiment, by reducing the rate of pilot signaling to zero, the overall average transmission power of the base station is reduced in the transmit standby mode of operation with respect to the active mode of operation.

FIG. 4-7 and 15 have been provided to explain the concepts of synchronization signaling power and/or rate reduction in accordance with the present invention. The characteristics of the air link resources, types of synchronization signaling, amounts of power reduction, and/or amounts of rate reduction may vary depending upon the type of system, and specifications of the system.

In one exemplary OFDM wireless communications system for a base station operating in the active mode, e.g., an OFDM symbol transmission time interval is approximately 100 micro-sec, a downlink tone block comprises 113 contiguous tones, a beacon signal occupies one tone for two successive OFDM symbol transmission time intervals, beacon signals occur once during a beacon slot of 912 OFDM symbol transmission time intervals and 4 pilot tone signals may be communicated during each of 896 OFDM symbol transmission time intervals during a beacon slot, and the pilot signals account for approximately 18% of the base station transmission power. In some such exemplary systems, a base station operating in a transmit standby has a reduced level of pilot signaling, e.g., one pilot tone signal for every eight OFDM symbol transmission time intervals where, in the active mode, there were previously pilot tone symbols transmitted. This exemplary transmit standby mode of base station operation corresponds to one pilot tone signal for each of 112 OFDM symbol transmission time intervals in a beacon slot. In some such exemplary embodiments, beacon signaling is unaltered between the two modes of base station operation. Although the beacon signal is typically transmitted at a much higher power level than a pilot signal, it is communicated much less frequency and the energy is concentrated on one or a few tones, thus limiting the interference damage. However, pilots are communicated much more frequently and consume a significant portion of the base station transmit power while in the active mode; therefore, reducing or limiting pilot signaling in the transmit standby mode can achieve more beneficial interference reductions. In addition, in some such embodiments, the base station does not transmit downlink traffic signals while operating in the transmit standby mode of operation, thereby additionally decreasing base station transmit power and interference levels.

In another type of wireless communication system, e.g., a CDMA system, spreading codes synchronization signals may be used, and the power level and/or number of spreading code synchronization signals are reduced when operating in the transmit standby mode of operation as compared to the active mode of operation.

FIG. 8 is a drawing 800 illustrating an exemplary base station, BS K 804, with cellular coverage area, cell K 802. Cell K 802 includes two exemplary wireless terminals (WT A 806, WT B 807) coupled to BS K 804 via wireless links (808, 809), respectively. BS K 804 may be in accordance with exemplary BS 200 of FIG. 2, while WT A and WT B may be in accordance with exemplary WT 300 of FIG. 3. BS K 804 is currently in an active mode of base station operation; WT A 806 is in an active-On state of WT operation; WT B 807 is in an active-Hold state of WT operation.

FIG. 9 is a drawing 900 illustrating an exemplary base station, BS L 904, with cellular coverage area, cell L 902. Cell L 902 includes exemplary two wireless terminals (WT C 906, WT D 908). BS L 904 may be in accordance with exemplary BS 200 of FIG. 2, while WT C 906 and WT D 908 may be in accordance with exemplary WT 300 of FIG. 3. WT C 906 and WT D 908 are currently in an off state. There are no WTs in cell L currently being serviced by BS L 904, and the base station L 904 is currently operating in the transmit standby mode of operation.

FIG. 10 is a drawing 1000 illustrating an exemplary base station, BS P 1004, with cellular coverage area, cell P 1002. Cell P 1002 includes exemplary two wireless terminals (WT E 1006, WT F 1008). BS P 1004 may be in accordance with exemplary BS 200 of FIG. 2, while WT E 1006 and WT F 1008 may be in accordance with exemplary WT 300 of FIG. 3. BS P 1004 is currently operating in a transmit standby mode of operation. WT E 1006 is currently off and is not being serviced by BS P 1004. WT F 1008 is currently in a sleep state of operation and is coupled to BS P 1004 via wireless link 1010. There are currently no WTs in cell P 1002 being serviced by BS P 1004 that are in an active state of operation.

Figure 11:
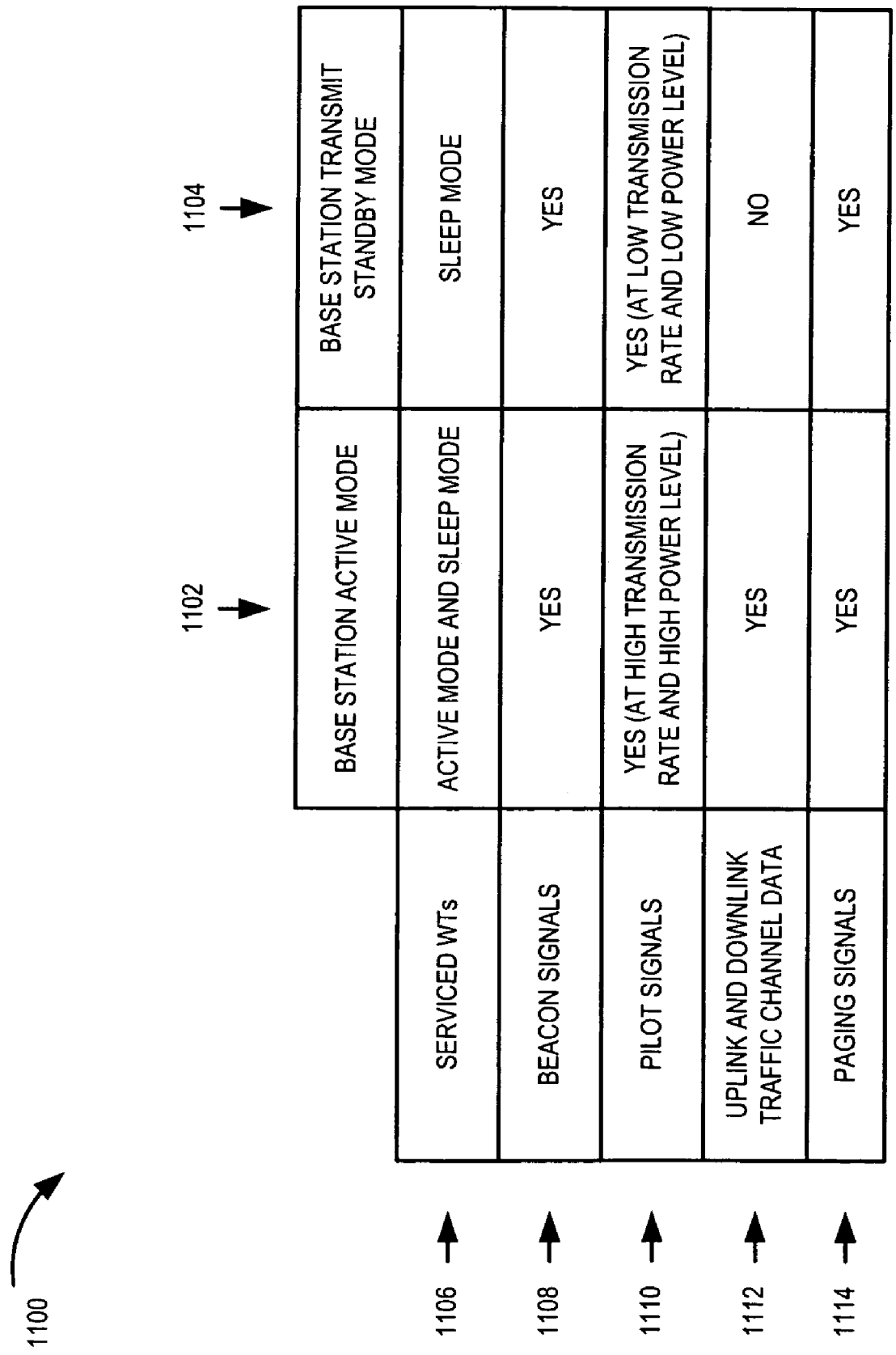
FIG. 11 is a drawing of a table illustrating characteristics of the base station active mode of operation and the base station transmit standby mode of operation for an exemplary embodiment, in accordance with the present invention.

FIG. 11 is a drawing of a table 1100 illustrating characteristics of base station active mode of operation and the base station transmit standby mode of operation for an exemplary embodiment, in accordance with the present invention. First information column 1102 lists information pertaining to the base station active mode of operation. Second information column 1104 lists information pertaining to the base station transmit standby mode of operation. First row 1106 identifies that in the base station active mode the BS can service WTs in the active mode and WTs in the sleep mode, while in the BS transmit standby mode of operation the BS can service WTs in the sleep mode of operation.

Second row 1108 identifies that beacon signals are communicated in both the active mode of operation and the transmit standby mode of operation in this exemplary embodiment. In this embodiment, the beacon signaling is the same regardless of the base station mode of operation. In some embodiments, the beacon signal is a relatively high power signal occupying one or a few, e.g., two or three or four, tones for a few, e.g., one or two or successive OFDM symbol transmission time intervals. In some such embodiments, the other tones of the downlink tone block are left unused during the beacon signal transmission. In some embodiments, the beacon signaling may be different in the two modes such that the power and/or rate is reduced in the transmit standby mode as compared to the active mode. In some embodiments, a beacon signal may include one or a few high power tones and a larger number of low power tones, e.g., 25 to 75 tones out of a tone block of 113 tones, being communicated during the same OFDM symbol transmission time interval or intervals. In some such embodiments, in the transmit standby mode of operation the high power tone may unaffected, but the rate and/or power level of the lower power tones may be reduced with respect to active mode.

Third row 1110 identifies that pilot signals are communicated in both the active mode and the transmit standby mode of operation; however, the transmission rate of the pilot signals and power level of the pilot signals is reduced in the transmit standby mode with respect to the active mode, in this exemplary embodiment. In some embodiments, one of: (i) pilot signal power level and (ii) rate of pilot signaling is reduced in the transmit standby mode of operation with respect to the active mode of operation.

Fourth row 1112 indicates that uplink and downlink traffic channel data is communicated in the base station active mode, but not in the base station transmit standby mode of operation, in this exemplary embodiment.

Fifth row 1114 indicates that paging signals are communicated in both the active mode and transmit standby mode of operation. In some embodiments, the paging signaling may be communicated at different rates and/or have different characteristic depending upon the mode of base station operation. For example, in active mode, paging opportunities may occur more frequently than in the transmit standby mode. In addition, in some embodiments paging signals in the active mode may convey more information and/or be structured to allow for a more rapid response by the WT to which the page is directed.

Figure 12:
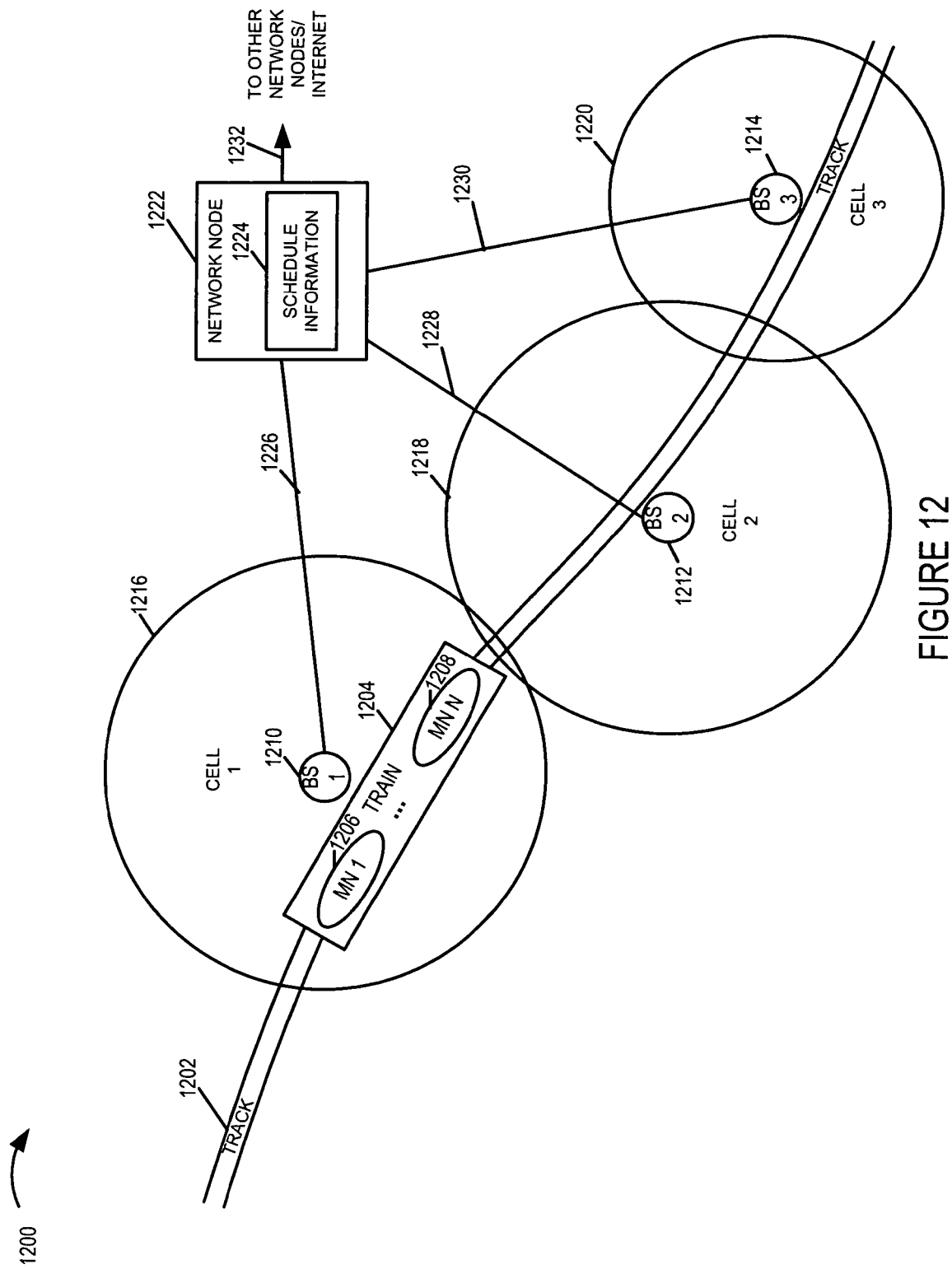
FIG. 12 is a drawing illustrating an exemplary communications system including a train routed through wireless cells and schedule information used in base station operational mode switching, the communication system implemented in accordance with the present invention and using methods of the present invention.

FIG. 12 is a drawing 1200 illustrating an exemplary communications system, implemented in accordance with the present invention and using methods of the present invention. FIG. 12 includes a plurality of base stations (BS 1 1210, BS 2 1212, BS 3 1214), each with a corresponding cellular coverage area (cell 1 1216, cell 2 1218, cell 3 1220), respectively. Train track 1202 is shown with exemplary train 1204 situated on the track 1202. In general, more than one train may be operating in the area covered by the communications system at the same time. Exemplary train 1204 includes a plurality of mobile nodes (MN 1 1206, MN N 1208).

The exemplary communications system also includes a network node 1222 coupled to (BS 1 1210, BS 2 1212, BS 3 1214) via wireless links (1226, 1228, 1230), respectively. Network node 1222 is coupled to other network nodes and/or the Internet via network link 1232. Network links (1226, 1228, 1230, 1232) may be, e.g., fiber optic links, cable link, and/or high capacity wireless links such as directed microwave links. Network node 1222 includes schedule information 1224.

The schedule information 1224 includes train schedule information, e.g., identifying when a train or trains will be within each BS's cellular coverage area. The network node 1222 by communicating schedule information and/or information derived from the schedule information to the BSs, can affect the switching of the base stations from transmit standby to active mode and from active mode to transmit standby mode. For example, the network node 1222 can send schedule information to each BS and the BS can switch accordingly. Alternatively, the network node can use to the schedule information to determine when to issue mode switch command signals to each base station to command base station mode switching operations.

In some embodiments, information derived from train tracking and/or train position detection mechanisms such as track sensors, e.g., already in place and used to prevent collisions, is used in controlling the transitioning of base stations from active to transmit standby mode and from transmit standby mode to active mode. In some embodiments, there is a controlled base station mode transitioning of base stations along the track 1202, e.g., directed by network node 1222 taking into account the current position of train 1204, the direction of train 1204, and the speed of train 1204.

Consider, as an example, that the area of track 1202 which runs through cells 1216, 1218, and 1220 is a rather remote rural area, with a very low population density. In such an embodiment, when train 1204 is not in a cell (1216, 1218, 1220), it may be advantageous to put the base station (1210, 1212, 1214) in a transmit standby mode of operation, thus reducing transmit power and reducing interference; however when the train is about to enter or is in the cell (1216, 1218, 1220) it may be advantageous to have the base station operating in active mode. In some embodiments, there can be a linkage along the track with adjacent base stations transitioning between modes as the trains MNs (1206, 1208) are handed off from one base station to the next. The reduced interference may be particularly beneficial in cell boundary areas, e.g., in a cell boundary area bordering on a higher population region where another adjacent base station may be typically operated continuously in the active mode of operation.

In some embodiments, under some conditions base stations are commanded into transmit standby mode when a train is at or near a specific location, e.g., a bridge or tunnel, e.g., for security purposes.

The methods described with respect to the train embodiment of FIG. 12 are also applicable to other transportation networks. For example base stations may be situated along flight paths and base station mode operation transitioning may be coordinated with flight schedule information.

Figures 13, 13A:
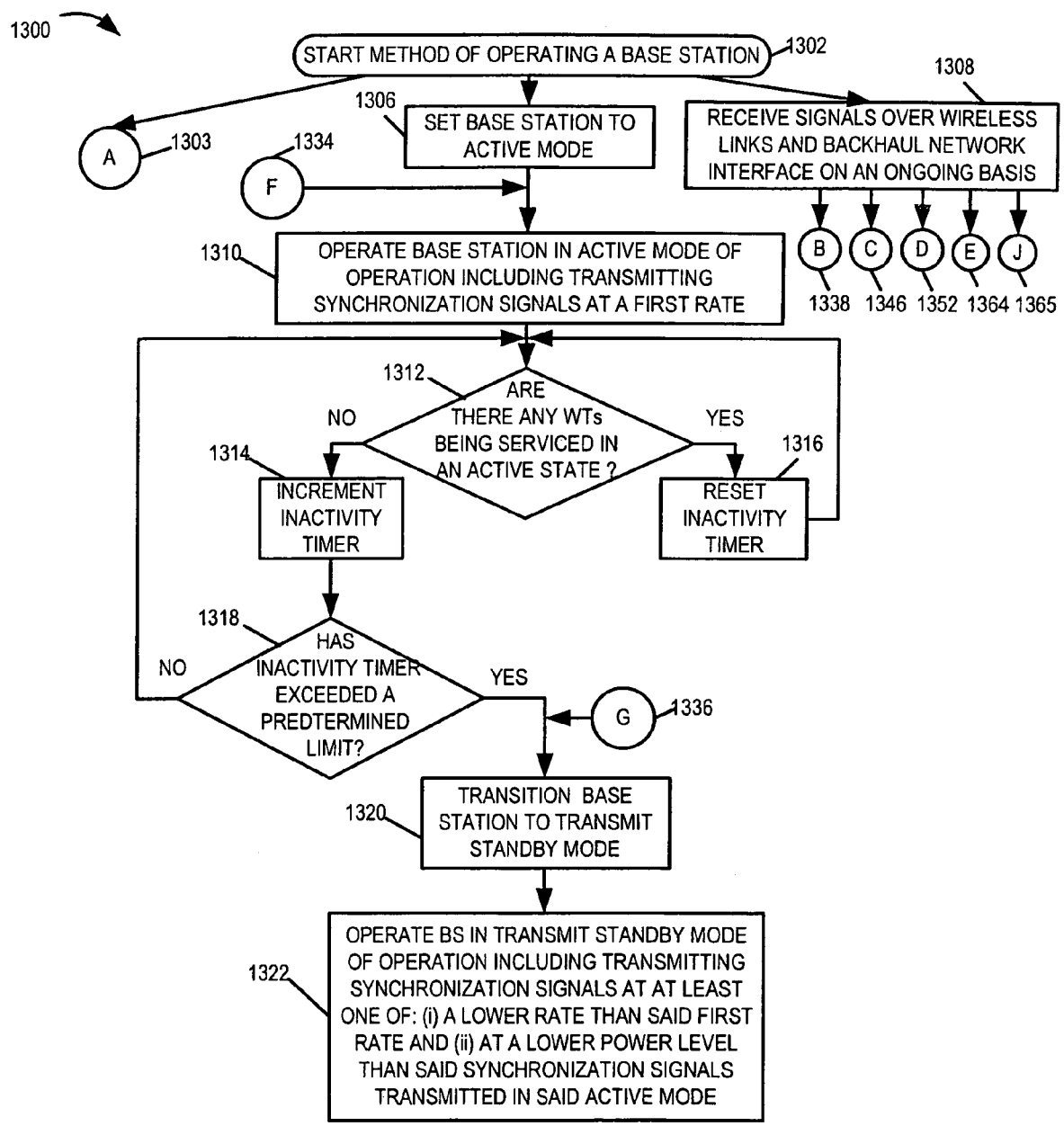
FIG. 13 comprising the combination of FIG. 13A, FIG. 13B.
Figure 13B:
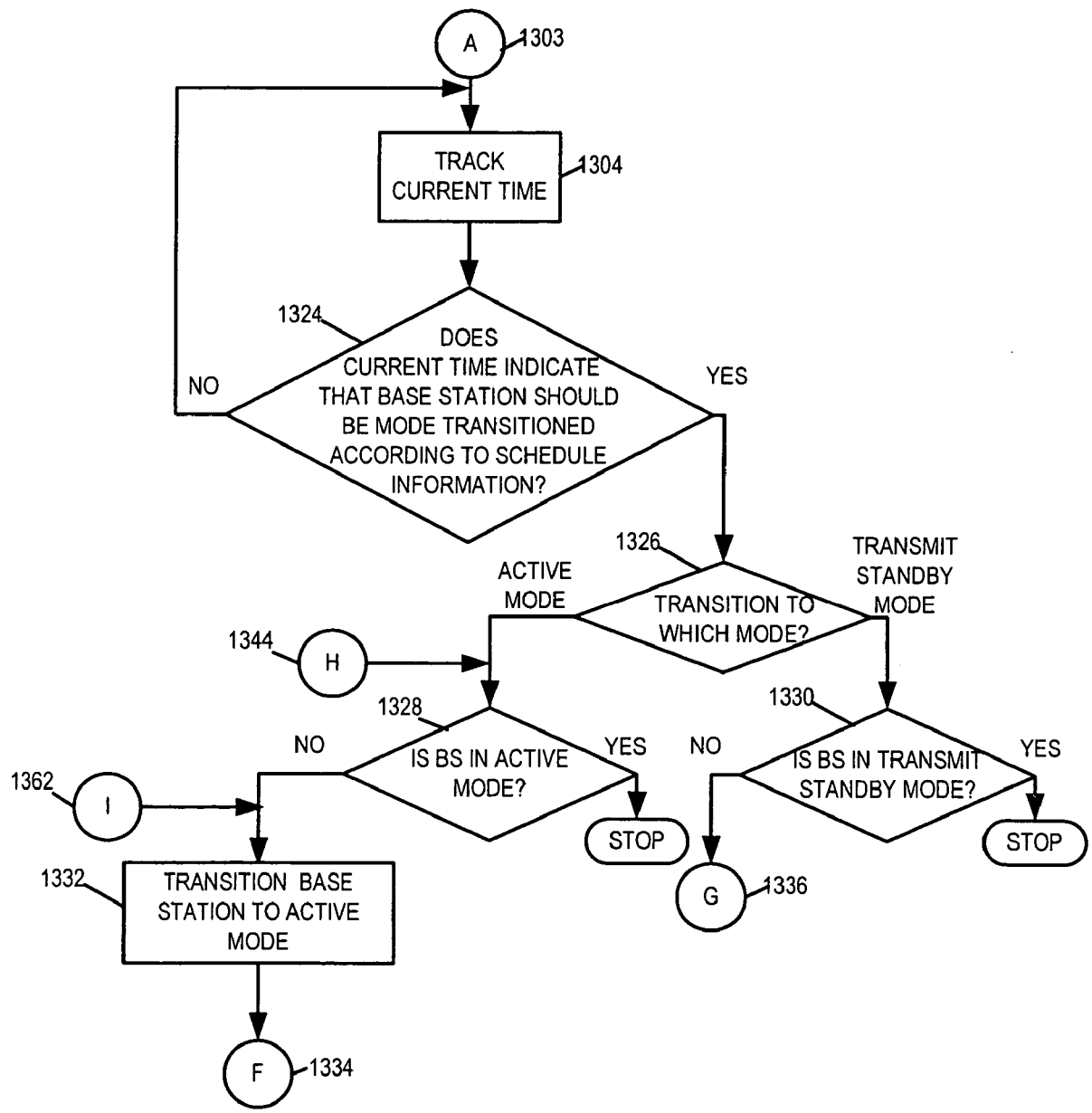
FIG. 13C is a flowchart of an exemplary method of operating a base station in accordance with the present invention.
Figure 13C:
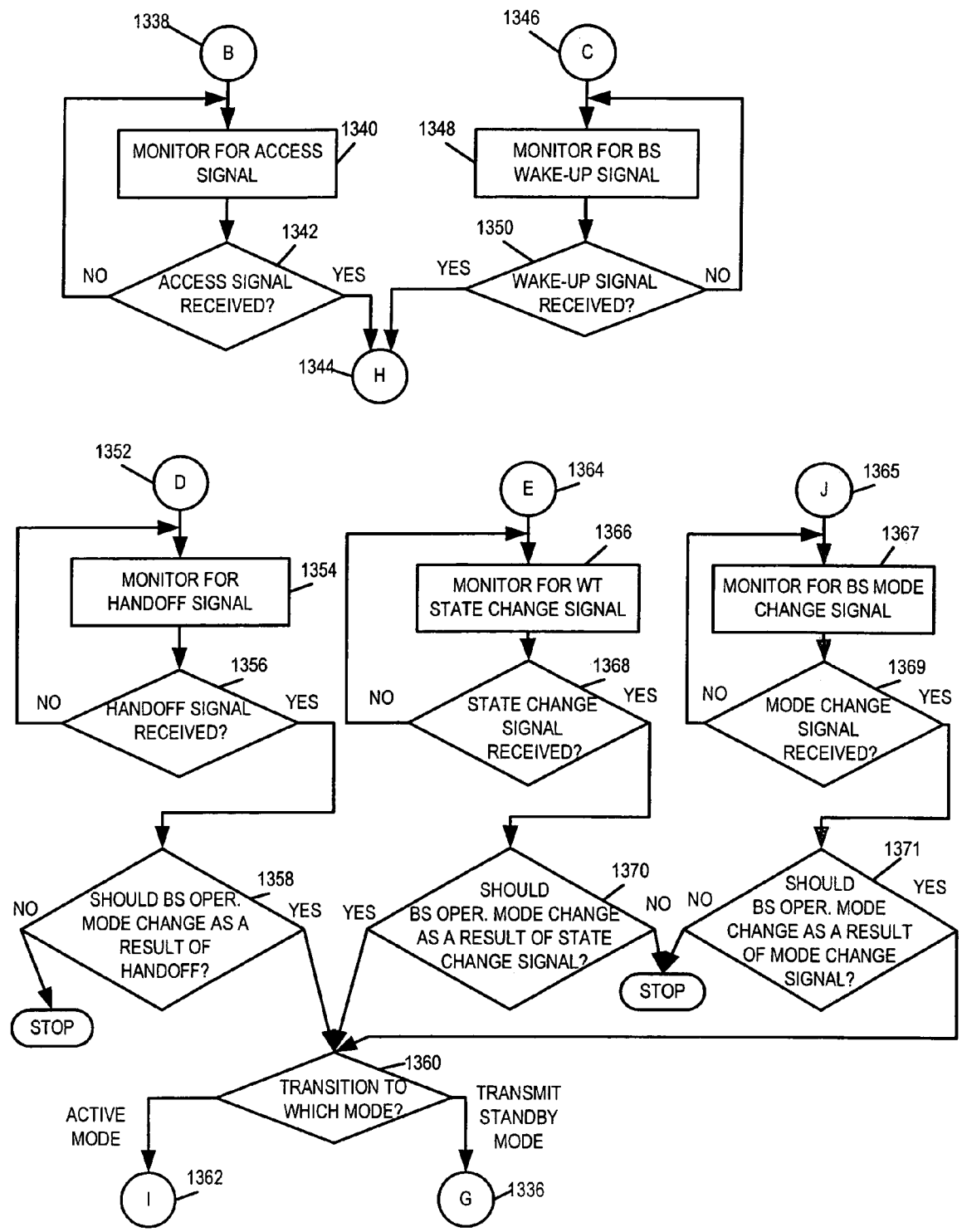

FIG. 13 comprising the combination of FIG. 13A, FIG. 13B, and FIG. 13C is a flowchart 1300 of an exemplary method of operating a base station in accordance with the present invention. The exemplary base station may be base station 200 of FIG. 2. The exemplary method starts in step 1302, where the base station is powered on and initialized. Operation proceeds from step 1302 to step 1306, step 1308, and via connecting node A 1303 to step 1304.

In step 1306, the base station is set to active mode, and then in step 1310, the base station is operated in the active mode of operation. The operations of step 1310 include during a first period of time transmitting synchronization signals at a first rate. For example, the synchronization signals may include a combination of beacon signals and pilot signals. In some embodiments, the active mode of operation may be considered a base station full-up operational state of operation capable of supporting one or more active users and supporting uplink and downlink traffic channel signaling. The first rate of synchronization signaling may be such to support relatively fast synchronization and channel estimation for WTs being serviced by the base station. Operation proceeds from step 1310 to step 1312.

In step 1312, the base station is operated to check as to whether there are any WTs being serviced in an active state. For example, WTs may register with a base station that it wishes to use as its point of network attachment. An exemplary registered wireless terminal may be in different states at different times, e.g., a sleep state or an active state; the active state may be further qualified to include an active-Hold state and an active-On state. The BS may control the WTs transitioning into the active state, and the control operations may include assigning WTs active user identifiers. The BS may track the number of users currently in active state. If in step 1312, it is determined that there are no WTs being serviced in an WT active state, e.g., no WTs currently registered with the BS being serviced are currently in the active state, then operation proceeds to step 1314; otherwise, operation proceeds to step 1316. In step 1316, the base station having determined that there is at least one registered WT in the active state, resets the inactivity timer. Operation proceeds from step 1316 back to step 1312, where the base station again checks to see if there are any WTs being serviced in the active state.

In step 1314, an inactivity timer is incremented. Operation proceeds from step 1314 to step 1318. In step 1318, the base station checks as to whether the inactivity timer has exceeded a predetermined limit. If the timer has exceeded the predetermined limit, operation proceeds to step 1320; otherwise, operation returns to step 1312, where the base station again checks as to whether or not there are any WTs being serviced in an active state.

In step 1320, the base station is operated to transition the base station to a transmit standby mode of operation. The transmit standby mode of operation is a state of base station operation in which the base station is not servicing active users, but may be servicing users in a sleep state, and in which the base station is operated to have a lower average output power than in the active mode, thus creating less interference in the system. Operation proceeds from step 1320 to step 1322. In step 1322, the base station is operated in a transmit standby mode of operation which includes during a second period of time during which synchronization signals are transmitted, the synchronization signals are transmitted at least one of: (i) a lower rate than in the active mode of operation, and (ii) a lower power level, than the synchronization signals transmitted in the active mode. In some embodiments, some of the synchronization signals, e.g., beacon signals, may be the same in both modes of base station operation, while other synchronization signals, e.g., pilot signals, may be reduced in power level and/or rate while in the transmit standby mode of operation.

Returning to step 1304, in step 1304, the base station is operated to track current time. Operation proceeds from step 1304 to step 1324. In step 1324, the base station checks as to whether the current time indicates that the base station should be mode transitioned according to schedule information. For example, the BS may be located in a remote rural area and may be transitioned between modes depended upon whether or not a train including mobile wireless terminals is currently within the vicinity of its cellular coverage area based upon train schedule information either stored and/or communicated to the base station. If the current time does not indicate that the base station should be mode transitioned, operation proceeds from step 1324, back to step 1304. However, if the current time indicates that a mode transition should be performed based upon schedule information, then operation proceeds from step 1324 to step 1326.

In step 1326, the base station is operated to determine whether the transition should be to an active mode in which case operation proceeds to step 1328 or to a transmit standby mode in which case operation proceeds to step 1330. In step 1328, the base station checks as to whether the BS is already in an active state in which case no further action is needed with regard to this transition. However, if in step 1328, it is determined that the BS is not in an active mode, then operation proceeds from step 1328 to step 1332, where the base station is operated to transition to an active mode. Operation proceeds from step 1332 via connecting node F 1334 to step 1310, where the base station is operated in active mode.

Returning to step 1330, in step 1330, the base station checks as to whether the BS is already in a transmit standby mode in which case no further action is needed with regard to this transition. However, if in step 1330, it is determined that the BS is not in an transmit standby mode, then operation proceeds from step 1330 via connecting node G 1336 to step 1320, where the base station is operated to transition to the transmit standby mode.

Returning to step 1308, in step 1308 the base station is operated to receive signals over wireless links and the backhaul network interface on an ongoing basis. Operation proceeds from step 1308 via connecting nodes (B 1338, C 1346, D 1352, E 1364, J 1365) to steps (1340, 1348, 1354, 1366, 1367), respectively.

In step 1340, the base station monitors for access signals from WTs seeking to register with the BS to use the base station as its point of network attachment. Operation proceeds from step 1340 to step 1342, where the base station checks as to whether or not an access signal has been received. If an access signal has not been received operation returns to step 1340; otherwise operation proceeds via connecting node H 1344 to step 1328, where the BS checks as to whether of not the BS is currently in active mode.

Returning to step 1348, in step 1348, the base station monitors for wake-up signals, e.g., via wireless links from WTs and/or via the backhaul network. A wake-up signal via the backhaul network may originate from a WT, from a centralized command node or from another network node such as an adjacent base station. For example, a wireless terminal currently connected to another adjacent BS, expecting to shortly implement hand-off operations resulting in a hand-off to the base station that it is seeking to wake-up, may initiate the wake-up signal and communicate the signal via its current point of network attachment. The WT may initiate this wake-up signal so as to obtain uninterrupted user data communications, and the wake-up signal information is ultimately communicated to the BS in transmit standby mode via the backhaul network. As another example, a centralized network control node may send the BS a wake-up signal via the backhaul, e.g., the centralized control node implementing control in accordance with train schedule information. As another example, another base station, e.g., an adjacent base station, being aware of active mobile users approaching the BS's outer cell perimeter may send the BS a wake-up signal via the backhaul, so that the BS can be transitioned into the active mode and ready for the active mobile users when they arrive in its cell. As still another example, a WT in the base stations cellular coverage area either recently powered on or in the sleep state may have detected that the BS is in a transmit standby mode, and the WT generates and sends a wake-up signal to the BS via a wireless channel. Operation proceeds from step 1348 to step 1350, where the base station checks as to whether or not a wake-up signal has been received. If a wake-up signal has not been received operation returns to step 1348; otherwise operation proceeds via connecting node H 1344 to step 1328, where the BS checks as to whether of not the BS is currently in active mode.

Returning to step 1354, in step 1354, the base station monitors for hand-off signals, e.g., via wireless links from WTs and/or via the backhaul network. Operation proceeds from step 1354 to step 1356, where the base station checks as to whether or not a hand-off signal has been received. If a handoff signal has not been received operation returns to step 1354; otherwise operation proceeds to step 1358. In step 1358 the base station determines whether or not an operational mode change should be implemented as a result of the received handoff signal. For example, consider that the received handoff signal is via a wireless link from the last currently registered wireless terminal being serviced by the base station, then after completing the handoff the base station can be transitioned into the transmit standby mode of operation. However, if such a received handoff signal was received while other registered WTs were still in an active state within the cell, a base station mode change would not be appropriate. As another example, consider that the handoff signal is via the backhaul network, indicating that an active wireless terminal is seeking to be handed off to the base station and that the base station is currently in a transmit standby mode of operation. Under such conditions it would be appropriate to transition the base station into active mode. However, if the base station was already in an active mode when such a handoff signal was received via the backhaul network no base station mode transition would be needed. If in step 1358 the base station determines that a mode change should result, operation proceeds to step 1360; otherwise, no further operations are performed to initiate a mode change in response to this received handoff signal.

In step 1360, the base station proceeds depending upon which mode transition direction. If the mode transition is to the active mode, operation proceeds from step 1360 via connecting node I 1362 to step 1332. If the mode transition is to the transmit standby mode, operation proceeds from step 1360 via connecting node G 1336 to step 1320.

Returning to step 1366, in step 1366, the base station monitors for state change signals, e.g., via wireless links from currently registered WTs. For example a registered WT may request to be transitioned from sleep state to active state so that it may transmit and receive user data. Operation proceeds from step 1366 to step 1368, where the base station checks as to whether or not a state change request signal has been received. In some embodiments, a request for additional air link resources, e.g., a request for a traffic channel segment may be viewed as a state change request signal. If a state change signal has not been received operation returns to step 1366; otherwise operation proceeds to step 1370. In step 1370 the base station determines whether or not an operational mode change should be implemented as a result of the received WT state change signal. For example, consider that the state change signal is from a currently registered wireless terminal being serviced by the base station in sleep state requesting a change to active state, and the base station is currently in transmit standby mode, then the BS should implement a mode change to active. However, if such a received WT state change signal was received while the base station was already in the active mode, a base station mode change would not be necessary. If in step 1370 the base station determines that a mode change should result, operation proceeds to step 1360; otherwise, no further operations are performed to initiate a base station mode change in response to this received WT state change request signal.

Returning to step 1367, in step 1367, the base station monitors for mode change signals, e.g., a command via the backhaul network indicating that the BS should change its operational mode. For example a network control mode or adjacent base station node may have decided to temporarily command the BS out of active mode and into transmit standby mode due to any of a number of conditions such as interference testing, load conditions, schedule, security considerations, etc. Operation proceeds from step 1367 to step 1369, where the base station checks as to whether or not a mode change request signal has been received. If a mode change signal has not been received operation returns to step 1367; otherwise operation proceeds to step 1371. In step 1371 the base station determines whether or not an operational mode change should be implemented as a result of the received base station state change signal. For example, different criteria for a mode change may apply depending upon the source of the mode change signal and or the current conditions of the base stations. Some received mode change signals are considered commands which the base station implements without further consideration, while other received mode change signals are considered requests, in which the base station has discretion regarding the mode change. For example, if the mode change command was by a centralized control node and issued for security reasons, the mode change may be implemented without further consideration. Alternatively, if the mode change signal was a suggestion to transition to transmit standby mode, based upon a schedule, e.g., a train schedule, and there happens to be additional registered active users outside the train, the command may be ignored by the base station. If in step 1371 the base station determines that a mode change should result, operation proceeds to step 1360; otherwise, no further operations are performed to initiate a mode change in response to this received BS mode change signal.

Figure 14:
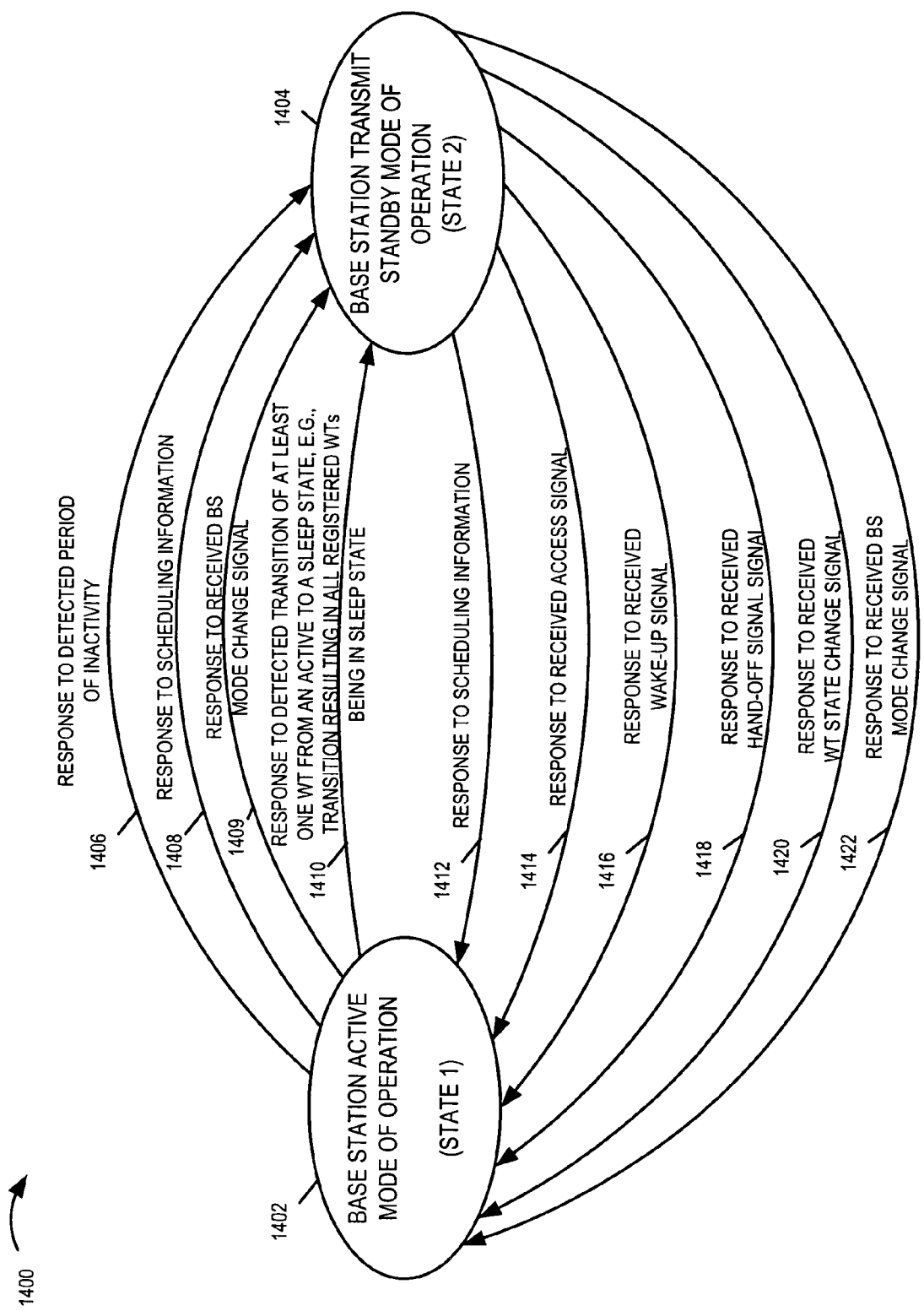
FIG. 14 is a drawing of a state diagram for an exemplary base station implemented in accordance with the present invention.

FIG. 14 is a drawing 1400 of a state diagram for an exemplary base station implemented in accordance with the present invention. The exemplary base station may be base station 200 of FIG. 2. The exemplary base station includes an exemplary state 1 1402, otherwise referred to as the base station active mode of operation, and an exemplary state 2 1404, otherwise referred to as a base station transmit standby mode of operation. The arrows indicate conditions for causing a transition of state. A state transition from the base station active mode of operation 1402 to the base station transmit standby mode of operation 1404 can be a response to: a detected period of inactivity 1406, scheduling information 1408, a received base station mode change signal 1409, a detected transition of at least one wireless terminal from an active to a sleep state 1410, e.g., the transition resulting in all wireless terminal currently registered with the base station being in a sleep state. A state transition from the base station transmit standby mode of operation 1404 to the base station active mode of operation 1402 can be a response to: scheduling information 1412, a received access signal 1414, a received wake-up signal 1416, a received hand-off signal 1418, a received WT state change signal 1420, e.g., state change request signal, or a received base station mode change signal 1422.

Figure 16:
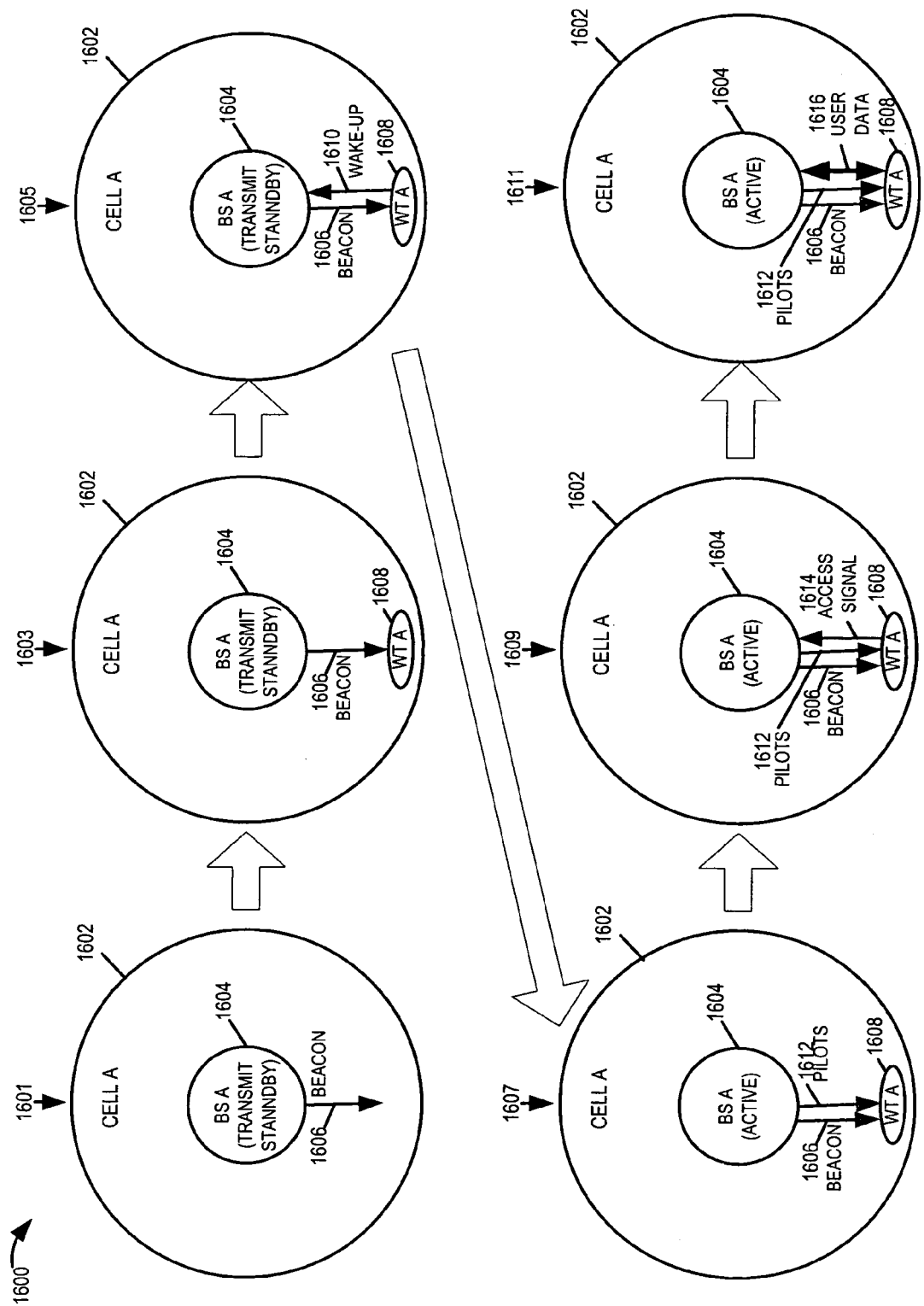
FIG. 16 is a drawing illustrating a series of time sequential operations in an exemplary embodiment of the present invention, the operations including base station wake-up signaling communicated over a wireless link.

FIG. 16 is a drawing 1600 illustrating a series of time sequential operations in an exemplary embodiment of the present invention. Diagrams (1601, 1603, 1605, 1607, 1609, and 1611) each represent successive time sequential operations for exemplary cell A 1602. Diagram 1601 illustrates that cell A 1602 includes exemplary base station A 1604, operating in a transmit standby mode of operation, sometimes referred to a sleep mode of base station operation. For this exemplary BS 1604, while operating in the transmit standby mode of operation, the BS 1604 transmits beacon signals 1606, but does not transmit pilot signals.

Diagram 1603 illustrates that WT A 1608 has entered the cell or powered on in the cell and has received the beacon signal 1606. The WT 1608 identifies BS A 1604 from recovered beacon signal information and recognizes that the BS 1604 is in transmit standby mode, e.g., from a lack of pilot signals.

Diagram 1605 illustrates that the WT 1608 sends a wake-up signal 1610 to BS A 1604. Wake-up signal 1610 is implemented for easy detection without the need for precise timing synchronization, e.g., a relatively high power signal at a known location in the uplink timing and frequency structure with a duration of two OFDM symbol transmission time intervals. In some embodiments, wake-up signal 1610 is implemented for easy detection without the need for any timing synchronization between the WT 1608 and the BS 1604, e.g., with the BS in transmit standby mode continuously monitoring certain predetermined tones for a wake-up signal. In some embodiments, the wake-up signal 1610 has the same characteristics as an access signal typically used for registration with an active base station.

Diagram 1607 indicates that the base station 1604 has recognized the wake-up signal 1610 and transitioned into the active mode of operation, e.g., reactivating the normal channels used for control and user data signaling including pilot signals 1612. Diagram 1609 indicates that the WT 1608 has recognized that the BS 1604 is in the active mode of operation, and the WT 1608 has transmitted an access request signal 1614, e.g., during one of the access intervals in the uplink timing and frequency structure using a contention based access segment. Diagram 1611 indicates that conventional registration of WT A 1608 has completed and the WTA 1608 has been accepted as an active user by BS A 1604. BS A 1604 is assigning WT A uplink and downlink traffic channel segments via which user data signals 1616 are being communicated.

Figure 17:
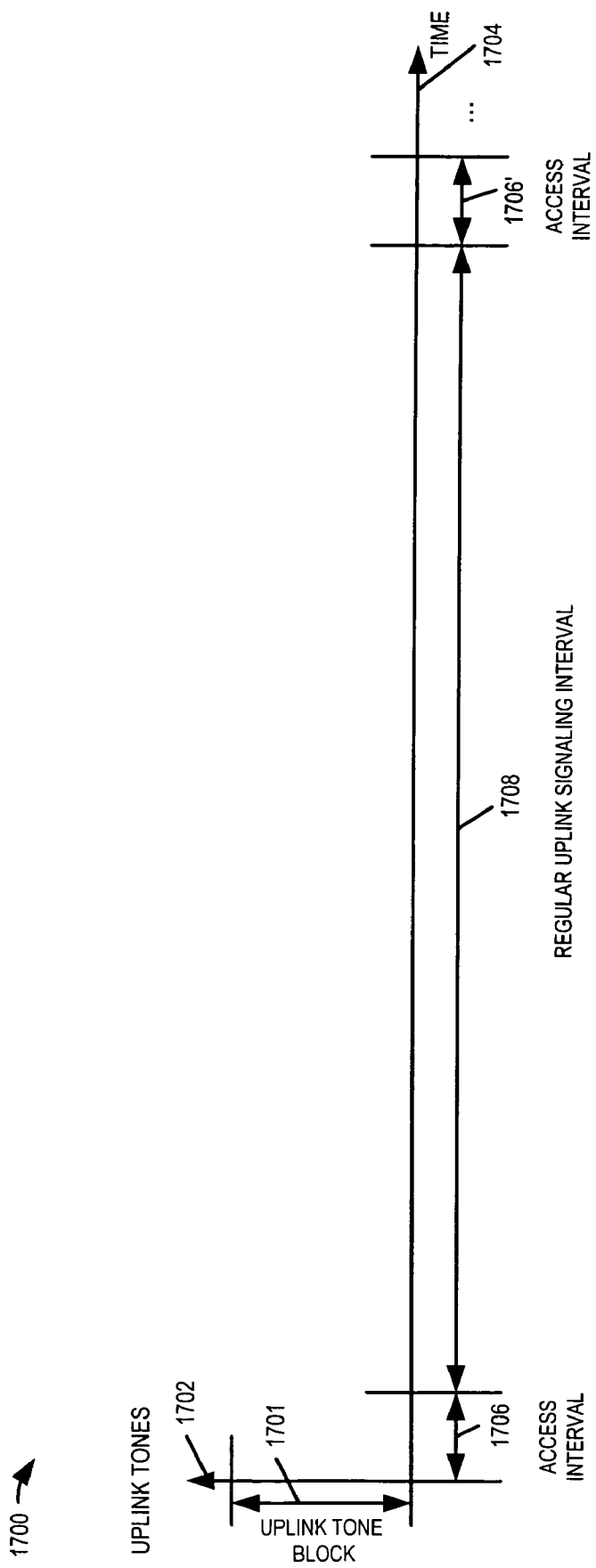
FIG. 17 is a drawing illustrating a portion of an exemplary OFDM uplink timing and frequency structure for the purpose of explaining exemplary base station wake-up signaling in accordance with various embodiments of the present invention.

FIG. 17 is a drawing 1700 illustrating a portion of an exemplary OFDM uplink timing and frequency structure. At the base station, the uplink timing can be referenced with respect to the downlink timing, e.g., with respect to a downlink beacon signal. Vertical axis 1702 indicates uplink tones and includes an uplink tone block 1701, e.g., of 113 contiguous tones. Horizontal axis 1704 represents time. The uplink timing structure includes access intervals 1706, 1706' and regular uplink signaling intervals 1708. The access intervals, e.g., access interval 1706, can be used for access signals, e.g., registration request signals, and base-station wake-up request signals. In some embodiments, depending upon the base station mode of operation, at least some of the tone-symbols of the access interval are used for different purposes. At least some of the signals transmitted by a WT during the access interval need not be precisely timing synchronized with respect to the base station, while signals transmitted by a WT during the regular uplink signaling interval 1708 typically have precise timing synchronization, e.g., to within a cyclic prefix duration. In some embodiments, signaling during the access interval uses contention based segments, while signaling during the regular uplink signaling interval uses allocated or assigned segments. The regular uplink signaling intervals can be used for various signaling including assigned uplink traffic channel segment signaling and uplink dedicated control channel signaling.

Figure 18:
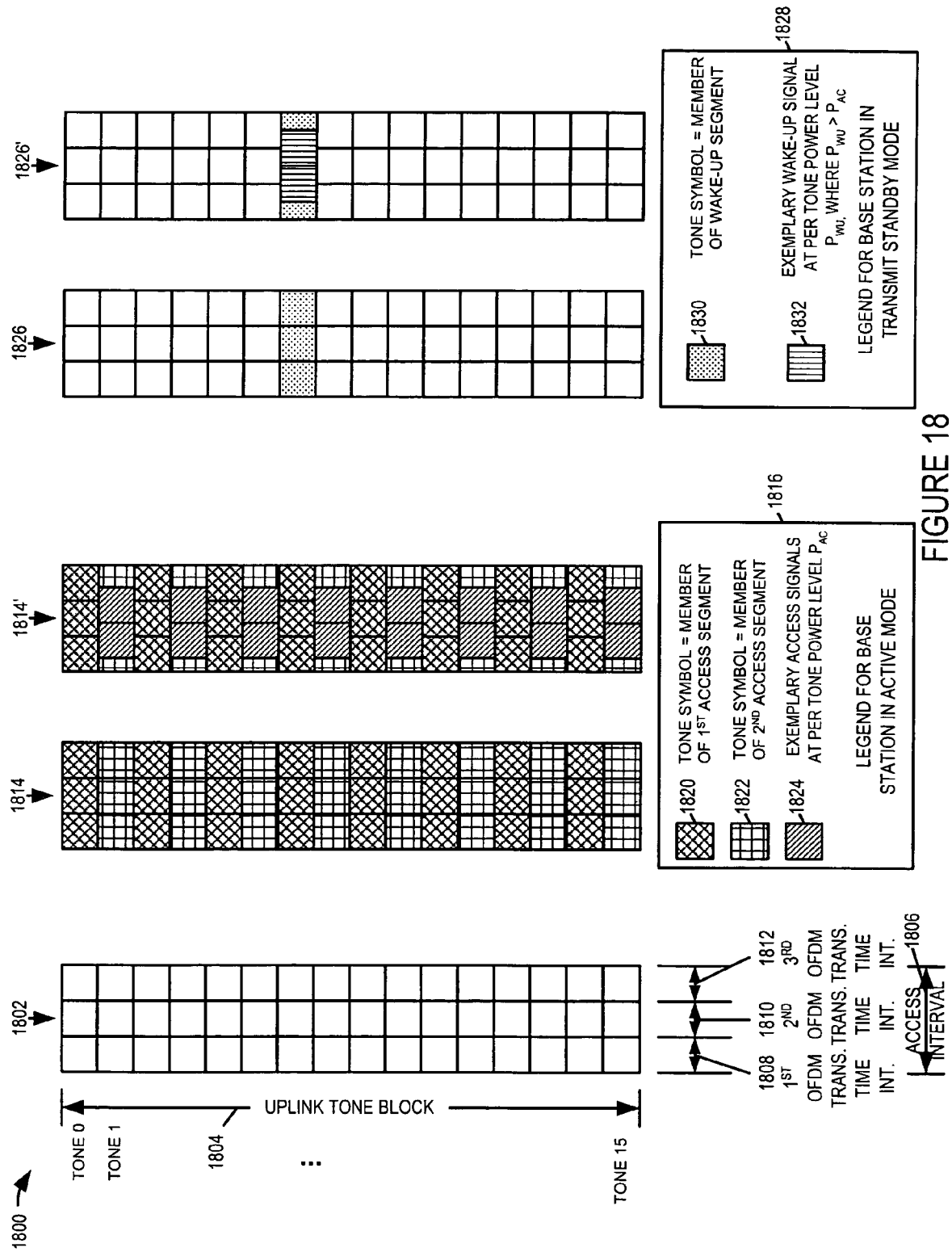
FIG. 18 is a drawing illustrating exemplary access interval uplink air link resources, exemplary segments and exemplary signaling corresponding to a base station active mode of operation and a base station transmit standby mode of operation, in accordance with some embodiments of the present invention.

FIG. 18 is a drawing 1800 illustrating exemplary access interval uplink air link resources, exemplary segments and exemplary signaling corresponding to a base station active mode of operation and a base station transmit standby mode of operation, in accordance with some embodiments of the present invention. Time frequency grid 1802 includes 48 tone-symbols, each tone-symbol represented by a small square block and each tone-symbol representing the uplink air link resources of one tone for one OFDM symbol transmission time interval. Time frequency grid 1802 includes a uplink tone block 1804 of 16 contiguous tones (tone 0, tone 1, . . . , tone 15), and has a time duration of an access interval 1806, where the access interval includes three consecutive OFDM symbol transmission time intervals (1808, 1810, 1812). In some embodiments, the access interval has a different duration, e.g., 8 consecutive OFDM symbol transmission time intervals.

Time frequency grid 1814 represents time frequency grid 1802 partitioned, during the base station active mode of operation, to include two access segments. In some embodiments a portion of the uplink air link resources during the access interval is reserved for access segments. Legend 1816 indicates that tone-symbols which are a member of the $1_{st}$ access segment are indicated by cross-hatched shading 1820, while tone-symbols which are a member of the $2^{nd}$ access segment are indicated by vertical and horizontal line shading 1822. During the base station active mode of operation, a wireless terminal seeking to register with the base station and use the base station as its point of network attachment uses one of the access segments to transmit an access request signal. In some embodiments, the WT randomly selects one of the access segments to use to communicate its uplink access registration request signal. Time frequency grid 1814' represents time frequency grid 1814, but also includes an additional access request signal represented with diagonal line shading 1824. The access request signaling is transmitted at per tone power level $P_{AC}$, and the WT need not be precisely timing synchronized with respect to the base station, e.g., timing synchronization error may be greater than an OFDM symbol cyclic prefix duration, but is sufficiently small such that the access request signal can be recognized by the base station and should be received at the base station within the time constraints of the access segment.

Time frequency grid 1826 represents time frequency grid 1802, during the base station transmit standby mode of operation; grid 1826 includes at least one wake-up segment. Legend 1828 indicates that tone-symbols which are a member of the wake-up segment are represented by dotted shading 1830. During, the base station transmit standby mode of operation, a wireless terminal seeking to wake-up the base station, resulting in the base station transitioning from transmit standby mode to active mode, uses the wake-up segment to transmit a wake-up signal. Time frequency grid 1826' represents time frequency grid 1826, but also includes an additional wake-up signal represented with vertical line shading 1832. The wake-up signaling is transmitted at per tone power level $P_{WU}$, where $P_{WU} > P_{AC}$ for the same WT, at the same location with the same detected beacon signal, and having the same amount of remaining battery power. The WT need not be precisely timing synchronized with respect to the base station, e.g., timing synchronization error may be greater than an OFDM symbol cyclic prefix duration, but sufficiently small such that the wake-up signal can be recognized by the base station and should be received at the base station within the time constraints of the wake-up segment. In accordance with some embodiments of the present invention, the number of tones used concurrently for the wake-up signal is reduced, e.g., to one, from the number of tones used concurrently for an access request signal, allowing the WT to significantly increase the per tone transmission power of a wake-up signal increasing the likelihood that a base station will successfully detect a wake-up signal.

In some embodiments in the transmit standby mode of operation, the base station turns off all transmission signaling except a minimum set of signaling that the wireless terminals may use to detect the presence of the base station and/or determine a coarse level of synchronization. In some such OFDM embodiments this minimum set of signaling is the beacon signaling, and the beacon signals may be communicated at the same or reduced power levels with respect to the active mode of operation. In some OFDM embodiments, this reduced set of signals can be beacons and pilots with the pilots being transmitted at reduced power and/or rate with respect to signaling in the active mode. In some embodiments, a wireless terminal after detecting the base station, e.g., via a received beacon, and desiring to wake-up the base station sends a wake-up signal to the base station; the base station upon detecting the wake-up signal reactivates the normal channels transitioning the base station into an active mode of operation. In various embodiments, the wake-up signal is designed for easy detection without the need for timing synchronization or precise timing synchronization. For example, in an exemplary OFDM embodiment, the wake up signal can be a double symbol tone at a known location in the uplink timing and frequency structure. In some embodiments, the wake-up signal can be a signal communicated at a relatively high uplink transmission power level, the signal being longer in duration than the normal modulation symbol value intended for a single OFDM tone-symbol, and the signal being communicated in two or more consecutive OFDM symbol transmission time intervals. In some embodiments, a regular access signal can be considered a wake-up signal if the base station receiving the signal is in a transmit standby mode of operation. In some embodiments, the same air link resources reserved for access signals may be reserved and used for wake-up signals. In some such embodiments, the access signals may be distinct from the wake-up signals.

Figure 19:
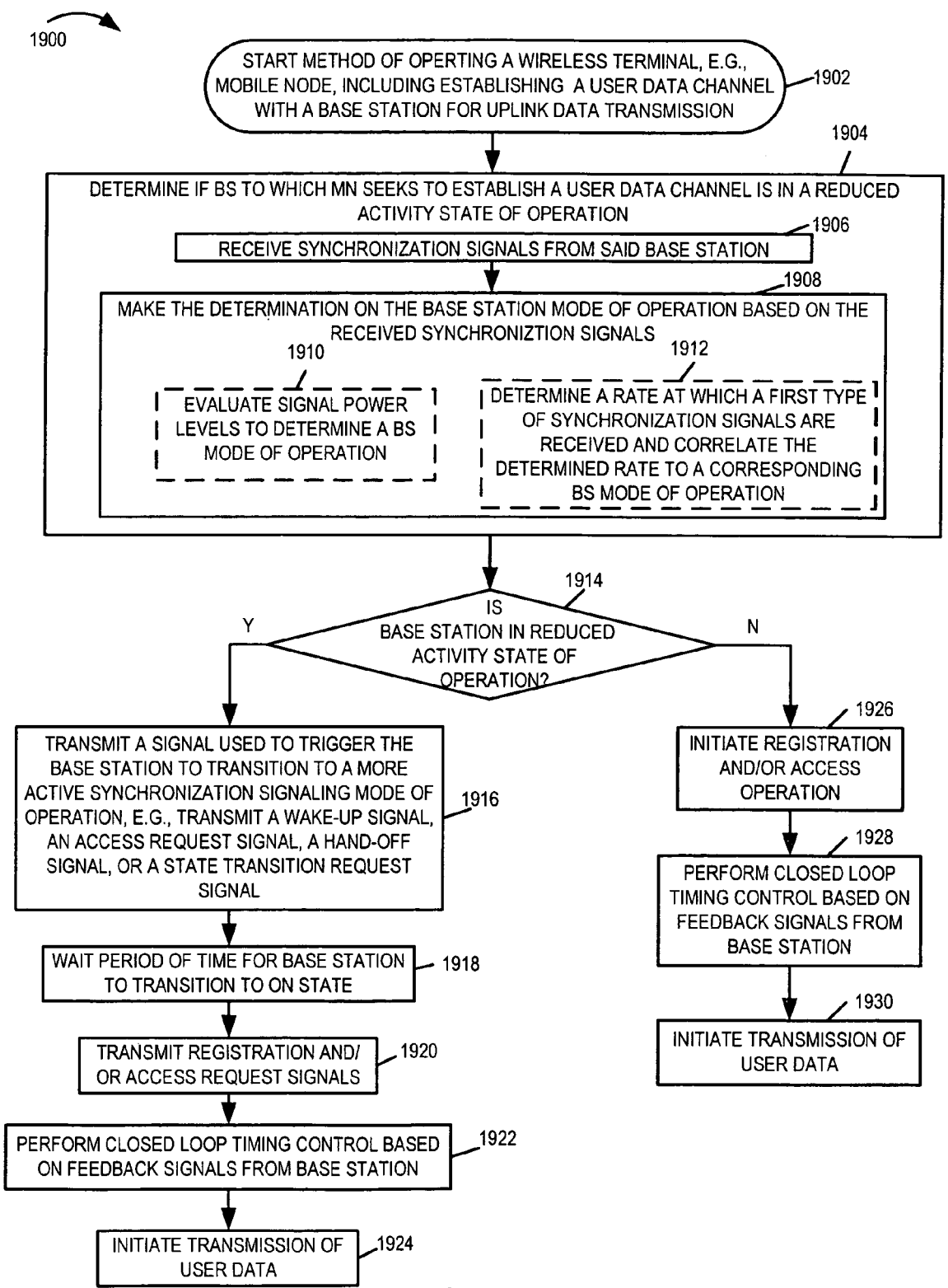
FIG. 19 is a flowchart of an exemplary method of operating a wireless terminal in accordance with the present invention.

FIG. 19 is a flowchart 1900 of an exemplary method of operating a wireless terminal, e.g., mobile node, in accordance with the present invention. The exemplary method of operation including establishing a user data channel with a base station for uplink data transmission starts in step 1902. For example, a wireless terminal may have powered on and initialized in step 1902 and desires to establish an uplink communications link with a base station network attachment point corresponding to the cellular coverage area in which it is located. As another example, a wireless terminal may be currently registered with a base station in whose cell it is located, but may be in a WT sleep state, and in step 1902 its starts to initiate operations to transition to a WT active state. As another example, a wireless terminal may be currently an active user with a different base station point of network attachment, located adjacent to the new base station that it seeks to establish a user data channel, and the wireless terminal enters a boundary region. Operation proceeds from start step 1902 to step 1904.

In step 1904, the wireless terminal determines if the base station to which it seeks to establish a user data channel is in a reduced activity state of operation. Step 1904 includes sub-step 1906 and sub-step 1908. In sub-step 1906, the wireless terminal receives synchronization signals from the base station. Then, in sub-step 1908, the wireless terminal makes the determination of the base station mode of operation based on the received synchronization signals.

In some embodiments, sub-step 1908 includes sub-step 1910, where the wireless terminal evaluates signal power levels to determine a base station mode of operation. In some embodiments, higher signal power levels of at least some types of synchronization signals are indicative of a full on mode of base station operation, while lower signal power levels of the same type of synchronization signals are indicative of a reduced synchronization signaling mode of operation, e.g., a base station sleep mode of operation. In various embodiments, the synchronization signals include at least two types of signals and the relative power of the two types of signals is indicative of a base station mode of operation. In some such embodiments, the at least two types of signals includes a first type of signal which is an OFDM beacon signal and a second type of signal which is a pilot tone signal, and the beacon tone signal has a per tone power at least three times the per tone signal power of a pilot tone signal. In some such embodiments the OFDM beacon per tone transmission power level is the same in both the base station sleep mode and the base station active mode; however the pilot signal per tone transmission power is reduced in the base station sleep mode of operation with respect to the base station active mode of operation.

In some embodiments, sub-step 1908 includes sub-step 1912 in which the wireless terminal determines a rate at which a first type of synchronization signals are received and correlates the determined rate to a corresponding base station mode of operation. In some such embodiments, the first type of synchronization signals are pilot tone signals. In some such embodiments, the base station is determined to be in a reduced synchronization signaling mode of operation, e.g., a sleep mode of base station operation, when the determined rate is below a predetermined threshold.

Operation proceeds from step 1904 to step 1914. In step 1914, the wireless terminal operation proceeds along different paths depending upon whether or not the base station is in a reduced activity state of operation. If the base station is in a reduced state of activity, e.g., a sleep state of base station operation, then operation proceeds from step 1914 to step 1916; however, if the base station is not in a reduced state of activity, e.g., the base station is in a full-on active mode of base station operation, then operation proceeds from step 1914 to step 1926.

In step 1916, the wireless terminal transmits a signal used to trigger the base station to transition to a more active synchronization signaling mode of operation, e.g., transmits a wake-up signal, an access request signal, a hand-off signal, or a state transition request signal.

In some embodiments, a signal used to trigger the base station to transition into a more active synchronization signaling mode of operation is a wake-up signal. In some such embodiments the characteristics of the wake-up signal are such to provide easy detection by a base station in sleep mode. In some embodiments, the wake-up signal includes less than 5 OFDM tones. In some such embodiments, the wake-up signal uses a single OFDM tone. In various embodiments, the wake-up signal is transmitted for a continuous period of time lasting more than one OFDM symbol transmission time period. In various embodiments, the wake-up signal is transmitted such that the signal occupies greater than a single OFDM transmission time interval, e.g., 2 successive OFDM symbol transmission time intervals, and the wireless terminal need not be precisely timing synchronized with respect to the base station, e.g., timing synchronization error may be greater than an OFDM cyclic prefix but is small enough such that the wake-up signal can be detected by the base station, e.g., the wireless terminal is synchronized with the base station to within an OFDM symbol transmission time interval. In some embodiments, a predetermined set of tones is used for the wake-up signal. In some embodiments, the predetermined set of tones includes at most one tone. In various embodiments, the wake-up signal is transmitted by the wireless terminal at a per tone power level that is higher than the average power level used by the wireless terminal to transmit user data. In some such embodiments, the wake-up signal is transmitted by the wireless terminal at the highest per tone power level used by the wireless terminal. In some embodiments, the wake-up signal is communicated using one of the tones utilized for access request signaling.

In some embodiments, a signal used to trigger the base station to transition into a more active synchronization signaling mode of operation is an access request signal, and the wireless terminal operates differently following transmission of the access request signal if the transmission of the access request signal was to a base station in a reduced synchronization mode of signaling operation than if the transmission was to a base station in a full-on mode of synchronization signaling operation. In such an embodiment, the base station implements different processes in response to the received access request signal depending upon the base station's current mode of operation.

In some embodiments, wherein the wireless terminal is currently connected as an active user via a wireless link to a current base station located adjacent to the base station to which the wireless terminal seeks to wake-up and establish a user data channel, a signal used to trigger the base station to transition into a more active synchronization mode of operation is transmitted through the current base station as part of a handoff operation. For example, a wireless terminal may be in a sector or cell boundary region and anticipate switching base station points of network attachment, and thus transmit such a signal to its current point of network attachment, and the signal may be forwarded, e.g., via the backhaul network to the base station that needs to be woke-up. In this manner, hand-off delays may be minimized.

In some embodiments, wherein the wireless terminal is already registered with the base station that the wireless terminal seeks to cause to transition to a more active mode of synchronization signaling and the wireless terminal is in a wireless terminal sleep mode of operation in which the wireless terminal does not transmit user data, the signal used to trigger the base station to transition into a more active synchronization mode of operation is a state transition request signal, e.g., a request by the wireless terminal to transition from a WT sleep mode to a WT active mode.

Operation proceeds from step 1916 to step 1918. In step 1918, the wireless terminal waits a period of time for the base station to transition to an ON state. In some embodiments, the wireless terminal monitors for a change in base station signaling, e.g., in terms of rate and/or power level of base station signaling to confirm that the base station has transitioned into the active state of operation. In some embodiments, the wireless terminal repeats the signal intended to cause the transition if a base station mode transition is not observed within a predetermined amount of time, e.g., within a number of OFDM symbol transmission time intervals, or at an expected point within the timing structure, e.g., the start of the next slot in the downlink timing structure after allowing for signaling transmission times and base station mode transitioning operations.

Then, in step 1920, the wireless terminal transmits registration and/or access request signals to the base station, e.g., an access request signals using a contention based access segment in an uplink timing and frequency structure associated with the base station. For example, for a wireless terminal new to the cell, a complete sequence of registration and access request signaling may occur. However, for a wireless terminal currently registered with the base station, but in WT sleep mode, the WT may have a registered user identifier but may seek to acquire an active user identifier and may initiate closed loop timing synchronization.

Operation proceeds from step 1920 to step 1922, where the wireless terminal performs closed loop timing control based on feedback signals from the base station. In some embodiments, wherein the wireless terminal is being handed-off between two base station network attachment points corresponding to the same cell, e.g., two sector attachment points of the same base station or two carrier frequency attachment points corresponding to the same sector of the same base station, some or all of the timing synchronization operations may be omitted. In some embodiments, closed loop power control pertaining to the wireless terminal transmission power level is also performed.

Then, in step 1924, the wireless terminal initiates the transmission of user data to the base station. For example, the wireless terminal may have been previously assigned a base station active user identifier, e.g., in step 1920, the base station scheduler may have assigned one or more uplink traffic channel segments to the wireless terminal, and the wireless terminal transmits user data using the assigned uplink traffic channel segments.

Returning to step 1926, in step 1926, the wireless terminal initiates registration and/or access operations, and then in step 1928, the wireless terminal performs closed loop timing control based on feedback signals from the base station. Operation proceeds from step 1928 to step 1930. In step 1930, the wireless terminal initiates the transmission of user data to the base station.

While described in the context of an OFDM system, many of the methods and apparatus of the present invention, are applicable to a wide range of communications systems including many non-OFDM and/or non-cellular systems.

In various embodiments nodes described herein are implemented using one or more modules to perform the steps corresponding to one or more methods of the present invention, for example, transitioning between two base station modes of operation, operating in an active base station mode of operation, operating in a transmit standby base station mode of operation, determining a base station mode of operation, signaling to cause a mode transition, processing mode transition related signaling, deciding whether or not to implement a mode transition, etc. In some embodiments various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware, to perform one or more of the steps of the above-described method(s).

Numerous additional variations on the methods and apparatus of the present invention described above will be apparent to those skilled in the art in view of the above description of the invention. Such variations are to be considered within the scope of the invention. The methods and apparatus of the present invention may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of the present invention.

What is claimed is:

1. A method operating a base station, comprising:
    operating in an active mode of operation during a first period of time, said active mode of operation including transmitting synchronization signals at a first rate; and
    operating in a transmit standby mode of operation during a second period of time during which at least some of said synchronization signals are transmitted at at least one of: i) a lower rate than in said active mode, and ii) at a lower power level than said synchronization signals transmitted in said active mode.

2. The method of claim 1, wherein the average transmission power level of said synchronization signals during said first period of time is higher than the average transmission power level of said at least some periodic signals during the second period of time.

3. The method of claim 2, wherein during said first period of time a first average amount of power is used for transmission of said synchronization signals, said synchronization signals being a set of non-traffic channel signals, said set of non-traffic channel signals including one of control and synchronization signals; and
    wherein during said second period of time the base station transmitter transmits said synchronization signals using an average transmission power level that is lower than said first average transmission power level.

4. The method of claim 3, wherein transmitting during said second period of time includes:
    transmitting at least one of said synchronization signals at a reduced power level relative to a power level at which said synchronization signals are transmitted during said first period of time.

5. The method of claim 1, wherein said synchronization signals are pilot signals.

6. The method of claim 3, wherein transmitting during said second period of time includes transmitting at least some of said synchronization signals at a reduced rate.

7. The method of claim 6, wherein said at least some synchronization signals includes at least one of beacon signals and pilot signals.

8. The method of claim 6, wherein said first period of time is a single OFDM symbol transmission time period in which at least some synchronization signals which are pilot signals are transmitted in parallel and wherein transmitting at least some of said synchronization signals at a reduced rate includes transmitting fewer pilot signals in a symbol transmission time period than said first number of synchronization signals.

9. The method of claim 8, wherein said first and second time periods correspond to the same symbol transmission time period in a recurring downlink timing structure.

10. The method of claim 2, wherein the first period of time is a period of time in which user data is communicated over a traffic channel between said base station and said wireless terminal; and
    wherein said second period of time is a period of time during which no user data is communicated between said base station and said wireless terminal.

11. The method of claim 8, wherein during said second period of time the base station does not service any wireless terminals over a wireless communications link or all wireless terminals being serviced by said base station over a wireless communications channel are in a sleep state.

12. The method of claim 1, further comprising:
    operating the base station to receive a signal; and
    to transition from said transmit standby mode of operation to said active mode of operation in response to said received signal.

13. The method of claim 12, wherein said received signal is one of an access signal, a base station wake-up signal, a handoff signal, and a state change signal.

14. The method of claim 13, wherein said signal is from the wireless terminal.

15. The method of claim 13, wherein said step of receiving a signal includes receiving said signal over a wireless communications link.

16. The method of claim 13, wherein said step of receiving a signal includes receiving said signal from a network node coupled to said base station.

17. The method of claim 1, further comprising:
    operating the base station to transition from said transmit standby mode of operation to said active mode of operation on a scheduled basis.

18. The method of claim 1, further comprising:
operating the base station to transition from said transmit standby mode of operation to said active mode in response to a signal received from another node.

19. The method of claim 1, further comprising:
operating the base station to transition from said active mode of operation to said transmit standby mode of operation in response to detecting a period of transmission channel inactivity.

20. The method of claim 1, further comprising:
transitioning from said active mode of operation to said transmit standby mode of operation in response to detecting a transition of at least one wireless terminal from an active to a sleep state of operation.

21. The method of claim 20, wherein the detected transition of at least one wireless terminal from an active to a sleep state of operation signifies that no wireless terminals currently being serviced by the base station are in an active state of operation.

22. The method of claim 1, further comprising:
transitioning from said active mode of operation to said transmit standby mode of operation according to a schedule.

23. A base station, comprising:
a transmitter for transmitting signals;
a first control module for controlling the transmission of synchronization signals during a first active mode of operation, said first control module controlling the transmission of at least some synchronization signals at a first rate and a first power level during said first active mode of operation; and
a second control module for controlling the transmission of synchronization signals during a second synchronization signal mode of operation, said second control module controlling the transmission of said at least some synchronization signals at a second rate and a second power level wherein at least one of said second rate and second power level are reduced relative to the first rate and first power level respectively.

24. The base station of claim 23, further comprising:
a base station mode transition control module for controlling transitions between said first and second synchronization signal modes of operation.

25. The base station of claim 24, further comprising:
a memory for storing schedule information used by said base station mode transition control module in determining when to transition between synchronization signaling modes of operation.

26. The base station of claim 25, wherein said schedule information includes date, time and corresponding mode information for a plurality of different times.

27. The base station of claim 24, further comprising:
a receiver for receiving signals from wireless terminals; and
wherein said base station mode transition control module is responsive to at least one of a wake signal, access request signal and mobile node state transition request signal received via said receiver.

28. The base station of claim 27, further comprising:
an interface coupling said base station to a network node; and
wherein said base station mode transition control module is responsive to at least one of a handoff signal, a wake signal, a state change command signal and a state change request signal communicated through said interface.

29. The base station of claim 28 wherein said base station mode transition control module transitions from said first active mode of operation to said second synchronization signal mode of operation in response to detecting no users with an active uplink over which user data is communicated for a period of time.

30. The base station of claim 29, wherein said base station transmitter is an OFDM signal transmitter.

* * * * *

UNITED STATES PATENT AND TRADEMARK OFFICE
CERTIFICATE OF CORRECTION

PATENT NO. : 7,756,548 B2  Page 1 of 1
APPLICATION NO. : 11/229846
DATED : July 13, 2010
INVENTOR(S) : Laroia et al.

It is certified that error appears in the above-identified patent and that said Letters Patent is hereby corrected as shown below:

Column 32, line 21, claim 7: "includes" to read as --include--

Signed and Sealed this
Nineteenth Day of July, 2011

David J. Kappos
*Director of the United States Patent and Trademark Office*